(12) United States Patent
Okada et al.

(10) Patent No.: US 8,445,103 B2
(45) Date of Patent: *May 21, 2013

(54) ADHESIVE COMPOSITION, ADHESIVE OPTICAL FILM AND IMAGE DISPLAY DEVICE

(75) Inventors: Kenichi Okada, Osaka (JP); Toshitaka Takahashi, Osaka (JP); Mika Kanamaru, Osaka (JP); Michio Umeda, Osaka (JP)

(73) Assignee: Nitto Denko Corporation, Osaka (JP)

( * ) Notice: Subject to any disclaimer, the term of this patent is extended or adjusted under 35 U.S.C. 154(b) by 244 days.

This patent is subject to a terminal disclaimer.

(21) Appl. No.: 12/801,453

(22) Filed: Jun. 9, 2010

(65) Prior Publication Data
US 2010/0304135 A1 Dec. 2, 2010

Related U.S. Application Data

(62) Division of application No. 11/337,838, filed on Jan. 24, 2006, now Pat. No. 7,759,442.

(30) Foreign Application Priority Data

| Jan. 26, 2005 | (JP) | 2005-018831 |
| Feb. 28, 2005 | (JP) | 2005-054476 |
| Nov. 16, 2005 | (JP) | 2005-331825 |
| Nov. 25, 2005 | (JP) | 2005-340658 |
| Dec. 15, 2005 | (JP) | 2005-361872 |
| Dec. 15, 2005 | (JP) | 2005-361873 |

(51) Int. Cl.
*C08F 30/02* (2006.01)
*B32B 27/30* (2006.01)
*B32B 7/12* (2006.01)

(52) U.S. Cl.
USPC ........ 428/353; 525/205; 428/354; 428/355 R; 428/522; 526/277

(58) Field of Classification Search
None
See application file for complete search history.

(56) References Cited

U.S. PATENT DOCUMENTS

| 4,018,732 A | 4/1977 | Lakshmanan |
| 4,044,044 A | 8/1977 | Saito |

(Continued)

FOREIGN PATENT DOCUMENTS

| CN | 1637062 A | 7/2005 |
| CN | 1749344 A | 3/2006 |

(Continued)

OTHER PUBLICATIONS

KAO Corporation; Dispersant for Soft Ferrites and Ceramics, Poize 532A (url=http://chemical.kao.co.jp/).

*Primary Examiner* — John J Figueroa
(74) *Attorney, Agent, or Firm* — Jean C. Edwards, Esq.; Edwards Neils PLLC

(57) ABSTRACT

To provide an adhesive composition which shows high adhesion with a glass substrate and has excellent heat resistance, moisture resistance and moist heat resistance, an adhesive optical film comprising an adhesive layer made of the adhesive composition, which shows high adhesion between the adhesive layer and an optical film and effectively suppresses the occurrence of adhesive residue and lack of adhesive and also has excellent heat resistance, moisture resistance and moist heat resistance, and an image display device comprising the adhesive optical film, the adhesive optical film comprises an optical film 1, an adhesive layer 3 made of a water dispersible adhesive composition comprising, as raw monomers, an alkyl (meth)acrylate ester whose alkyl group has 4 to 18 carbon atoms, a carboxyl group-containing vinyl monomer, a phosphoric acid group-containing vinyl monomer, and a copolymerizable vinyl monomer which is optionally copolymerizable with the above monomers, wherein a carboxyl group concentration is from 0.05 to 1.50 mmol/g and a phosphoric acid group concentration is from 0.01 to 0.45 mmol/g in the raw monomers, an under coat layer 2 containing an oxazoline group-containing polymer, and being interposed between the optical film 1 and the adhesive layer 3, and the adhesive optical film is applied onto an image display device.

12 Claims, 1 Drawing Sheet

U.S. PATENT DOCUMENTS

| | | | |
|---|---|---|---|
| 4,259,117 A | 3/1981 | Yamauchi et al. | |
| 4,433,124 A | 2/1984 | Okamoto et al. | |
| 4,602,640 A | 7/1986 | Wada et al. | |
| 4,731,282 A | 3/1988 | Tsukagoshi et al. | |
| 5,587,410 A | 12/1996 | Kanaida et al. | |
| 5,637,368 A | 6/1997 | Cadalbert et al. | |
| 5,767,188 A | 6/1998 | Kamikuri et al. | |
| 6,165,602 A * | 12/2000 | Fujita | 428/216 |
| 6,512,068 B1 | 1/2003 | Nakatsuka | |
| 6,555,240 B1 | 4/2003 | Nishikori et al. | |
| 6,565,945 B1 | 5/2003 | Nishikori et al. | |
| 6,670,010 B2 | 12/2003 | Nagamoto et al. | |
| 6,846,538 B2 | 1/2005 | Sato et al. | |
| 6,984,413 B2 | 1/2006 | Yamamoto et al. | |
| 7,309,925 B2 | 12/2007 | Matsumura et al. | |
| 7,429,522 B2 | 9/2008 | Matsumura et al. | |
| 7,641,946 B2 * | 1/2010 | Kanamaru et al. | 428/1.54 |
| 7,759,442 B2 | 7/2010 | Okada et al. | |
| 7,858,709 B2 | 12/2010 | Takahasi et al. | |
| 2002/0155244 A1 | 10/2002 | Sakurai et al. | |
| 2003/0012949 A1 | 1/2003 | Yamamoto et al. | |
| 2004/0180148 A1 | 9/2004 | Hieda et al. | |
| 2004/0209007 A1 | 10/2004 | Satake et al. | |
| 2004/0213992 A1 | 10/2004 | Shirai et al. | |
| 2005/0073633 A1 | 4/2005 | Satake et al. | |
| 2005/0139973 A1 | 6/2005 | Matsumura et al. | |
| 2005/0165159 A1 | 7/2005 | Ogura et al. | |
| 2006/0057368 A1 | 3/2006 | Kobayashi et al. | |
| 2006/0188712 A1 | 8/2006 | Okada et al. | |
| 2006/0257760 A1 | 11/2006 | Mori et al. | |
| 2008/0088036 A1 | 4/2008 | Matsumura et al. | |
| 2008/0281038 A1 | 11/2008 | Takahashi et al. | |
| 2009/0017298 A1 * | 1/2009 | Okada et al. | 428/354 |
| 2010/0304135 A1 | 12/2010 | Okada et al. | |

FOREIGN PATENT DOCUMENTS

| | | |
|---|---|---|
| CN | 1827725 A | 9/2006 |
| JP | 59-080482 | 5/1984 |
| JP | 59-204679 | 11/1984 |
| JP | 63-27446 | 2/1988 |
| JP | 63-33943 | 9/1988 |
| JP | 2-73307 | 3/1990 |
| JP | 2-238076 | 9/1990 |
| JP | 04-124601 | 4/1992 |
| JP | 06-198703 | 7/1994 |
| JP | 06-220408 A | 8/1994 |
| JP | 6-336568 | 12/1994 |
| JP | 07-026223 A | 1/1995 |
| JP | 7-133467 | 5/1995 |
| JP | 7-278383 | 10/1995 |
| JP | 7-316508 | 12/1995 |
| JP | 08-134423 A | 5/1996 |
| JP | 8-209083 | 8/1996 |
| JP | 9-278975 | 10/1997 |
| JP | 10-20118 | 1/1998 |
| JP | 10-044291 A | 2/1998 |
| JP | 10-044292 A | 2/1998 |
| JP | 10-077455 A | 3/1998 |
| JP | 10-140094 | 5/1998 |
| JP | 2000-109754 | 4/2000 |
| JP | 2000-186259 | 7/2000 |
| JP | 2000-248082 | 9/2000 |
| JP | 2001-150612 | 6/2001 |
| JP | 2001-152118 A | 6/2001 |
| JP | 2001-234136 | 8/2001 |
| JP | 2001-254063 | 9/2001 |
| JP | 2001-288404 | 10/2001 |
| JP | 2002-047413 A | 2/2002 |
| JP | 2002-47468 | 2/2002 |
| JP | 2002-258754 | 9/2002 |
| JP | 2002-309212 | 10/2002 |
| JP | 2003-034781 A | 2/2003 |
| JP | 2003-96420 | 4/2003 |
| JP | 2004-54007 | 2/2004 |
| JP | 2004-78143 | 3/2004 |
| JP | 2004-78413 | 3/2004 |
| JP | 2004-338379 | 12/2004 |
| JP | 2005-23293 | 1/2005 |
| JP | 2005-115028 A | 4/2005 |
| JP | 2005-173462 | 6/2005 |
| JP | 2005-179412 | 7/2005 |
| JP | 2005-206689 A | 8/2005 |
| JP | 2005-238651 A | 9/2005 |
| JP | 2005-241989 A | 9/2005 |
| JP | 2005-272660 A | 10/2005 |
| JP | 2006-008950 | 1/2006 |
| JP | 2006-119349 A | 5/2006 |
| JP | 2006-160773 A | 6/2006 |
| JP | 08-245932 | 9/2006 |
| JP | 2006-282733 A | 10/2006 |
| JP | 2006-316085 | 11/2006 |
| JP | 2007-039607 A | 2/2007 |
| JP | 2007-056248 | 3/2007 |
| JP | 2007-070610 A | 3/2007 |
| JP | 2007-171892 A | 7/2007 |
| KR | 10-2005-0067091 | 6/2005 |
| TW | 593620 | 6/2004 |
| TW | 200427806 A | 12/2004 |
| TW | 200500720 A | 1/2005 |
| WO | WO 01/64806 A1 | 9/2001 |
| WO | WO 03/065087 A1 | 8/2003 |

* cited by examiner

ADHESIVE COMPOSITION, ADHESIVE OPTICAL FILM AND IMAGE DISPLAY DEVICE

The present application is a Divisional Application of U.S. patent application Ser. No. 11/337,838, filed on Jan. 24, 2006, which claims priority from Japanese Patent Application No. 2005-018831, filed on Jan. 26, 2005, Japanese Patent Application No. 2005-054476, filed on Feb. 28, 2005, Japanese Patent Application No. 2005-331825, filed on Nov. 16, 2005, Japanese Patent Application No. 2005-340658, filed on Nov. 25, 2005, Japanese Patent Application No. 2005-361872, filed on Dec. 15, 2005, and Japanese Patent Application No. 2005-361873, filed on Dec. 15, 2005, the contents of each and all of which are herein incorporated by reference in their entirety

BACKGROUND OF THE INVENTION

1. Field of the Invention

The present invention relates to an adhesive composition, an adhesive optical film, and an image display device. More particularly, it relates to an adhesive composition, an adhesive optical film used as various optical films comprising an adhesive layer and an under coat layer, and an image display device.

2. Description of the Background Art

Heretofore, optical films such as polarizing film, phase difference film, luminance improving film, and view-angle expansion film have been used for various industrial purposes and, for example, these optical films are used for sticking onto image display devices such as liquid crystal display, organic electroluminescence device (organic EL display device), and plasma display panel (PDP).

As the optical film to be sticked onto a liquid crystal display, an adhesive optical film comprising an optical film laminated with an adhesive is known.

For example, there is proposed an adhesive optical film in which an isocyanate-based polyfunctional compound is added to an acrylic polymer solution to prepare an adhesive solution and layer made of the resulting adhesive solution is laminated on a polarizing film comprising an under coat layer (anchor layer) made of a water dispersible polyester-based resin (see, for example, Japanese Unexamined Patent Publication No. 2004-54007).

For example, there is also proposed an adhesive optical film in which an adhesive layer is laminated on an optical film with an under coat layer made of a polyamine compound interposed (see, for example, Japanese Unexamined Patent Publication No. 2004-78143).

Further, for example, there is also proposed an adhesive polarizing plate in which an acrylic adhesive layer is laminated on a polarizing plate with an under coat layer made of a polyacrylic ester having a primary amino group (see, for example, Japanese Unexamined Patent Publication No. 10-20118).

In view of the environmental burden, it has recently been required to reduce the use of an organic solvent, and a solvent-based adhesive containing an organic solvent as a solvent is replaced by a water dispersible adhesive containing water as a dispersion medium.

As such the water dispersible adhesive, for example, there is proposed a pressure sensitive adhesive composition comprising a copolymer emulsion in which a copolymer contains 2-ethylhexyl methacrylate of the amount of 10 to 50% by weight based on the entire copolymer and the copolymer has a glass transition temperature of $-25°$ C. or lower (see, for example, Japanese Unexamined Patent Publication No. 2001-254063).

However, conventional adhesives including those disclosed in the above-mentioned Japanese Unexamined Patent Publication No. 2004-54007, Japanese Unexamined Patent Publication No. 2004-78143 and Japanese Unexamined Patent Publication No. 10-20118 show low adhesion with an optical film. When an optical film is sticked onto a liquid crystal display, the optical film is usually sticked onto the liquid crystal display and, if necessary, the optical film is once removed for positioning and then sticked again (reworking). However, these adhesives are remained on the surface of the liquid crystal display when removed (hereinafter referred to as "adhesive residue"), and thus reworkability is insufficient.

When the terminal portion of an adhesive optical film contacts with persons or articles in the vicinity in case of handling in the step of cutting or conveying the adhesive optical film, the adhesive is removed at the contact portion (hereinafter referred to as "lack of adhesive"). When the adhesive optical film, which caused lack of adhesive, is attached onto a liquid crystal display, a problem such as poor display occurs.

Conventional water dispersible adhesives including those disclosed in the above-mentioned Japanese Unexamined Patent Publication No. 2001-254063 show particularly low adhesion to a hydrophilic adherend such as glass and therefore it has difficulty to firmly stick to a glass substrate of a liquid crystal display, although adhesion to a hydrophobic adherend such as polyolefin is improved.

Furthermore, excellent heat resistance, which does not cause defects due to severe heating, is required for an adhesive to be laminated for an adhesive optical film. According to the purposes, the adhesive may be used under not only severe heating conditions but also severe heating and humidifying conditions, and thus excellent moist heat resistance is also required.

With respect to a water dispersible adhesive to be laminated on an optical film, heat resistance and moisture resistance, which does not cause deterioration of adhesion due to severe heating and humidifying, are required.

SUMMARY OF THE INVENTION

An object of the present invention is to provide an adhesive composition which shows excellent adhesion with a glass substrate and has excellent heat resistance, moisture resistance or moist heat resistance, an adhesive optical film comprising an adhesive layer made of the adhesive composition, which shows excellent adhesion between the adhesive layer and an optical film and effectively suppresses an occurrence of an adhesive residue and a lack of adhesive and also has excellent heat resistance, moisture resistance and moist heat resistance, and an image display device comprising the adhesive optical film.

The adhesive composition of the present invention comprises, as raw monomers, an alkyl (meth)acrylate ester whose alkyl group has 4 to 18 carbon atoms, a carboxyl group-containing vinyl monomer, a phosphoric acid group-containing vinyl monomer represented by the following general formula (1), and a copolymerizable vinyl monomer which is optionally copolymerizable with the above monomers, wherein, with respect to a proportion of the raw monomers, an amount of the alkyl (meth)acrylate ester is from 60 to 99 parts by weight based on 100 parts by weight of the total amount of the raw monomers, and a total proportion of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.45 mmol/g in the raw monomers:

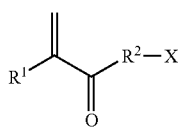
(1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3),

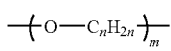
(2)

in the general formula (2), n represents an integer of 1 to 4, and m represents an integer of 2 or more, and

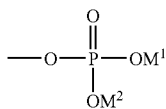
(3)

in the general formula (3), $M^1$ and $M^2$ each independently represents a hydrogen atom or a cation.

Further, in the adhesive composition of the present invention, with respect to the proportion of the raw monomers, the amount of the alkyl (meth)acrylate ester is preferably from 60 to 99 parts by weight, the amount of carboxyl group-containing vinyl monomer is preferably from 0.5 to 15 parts by weight, the amount of the phosphoric acid group-containing vinyl monomer is preferably from 0.5 to 20 parts by weight, and the proportion of the copolymerizable vinyl monomer is preferably 39 parts by weight or less, based on 100 parts by weight of the total amount of the raw monomers.

Further, it is preferable that the adhesive composition of the present invention contains, as the copolymerizable vinyl monomer, an alkoxysilyl group-containing vinyl monomer, the amount being from 0.001 to 1 parts by weight based on 100 parts by weight of the total amount of the raw monomers.

It is preferable that the adhesive composition of the present invention is a water dispersible adhesive composition.

An adhesive optical film of the present invention includes an adhesive layer, the adhesive layer being made of an adhesive composition that includes, as raw monomers, an alkyl (meth)acrylate ester whose alkyl group has 4 to 18 carbon atoms, a carboxyl group-containing vinyl monomer, a phosphoric acid group-containing vinyl monomer represented by the following general formula (1), and a copolymerizable vinyl monomer which is optionally copolymerizable with the above monomers, wherein with respect to a proportion of the raw monomers, an amount of the alkyl (meth) acrylate ester is from 60 to 99 parts by weight based on 100 parts by weight of the total amount of the raw monomers, and a total proportion of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.45 mmol/g in the raw monomers:

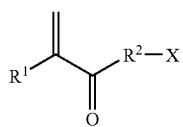
(1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3)

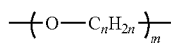
(2)

in the general formula (2), n represents an integer of 1 to 4, and m represents an integer of 2 or more, and

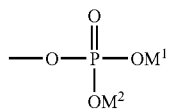
(3)

in the general formula (3), $M^1$ and $M^2$ each independently represents a hydrogen atom or a cation.

An image display device of the present invention includes at least one adhesive optical film having an adhesive layer, the adhesive layer being made of an adhesive composition that includes, as raw monomers, an alkyl (meth)acrylate ester whose alkyl group has 4 to 18 carbon atoms, a carboxyl group-containing vinyl monomer, a phosphoric acid group-containing vinyl monomer represented by the following general formula (1), and a copolymerizable vinyl monomer which is optionally copolymerizable with the above monomers, wherein with respect to a proportion of the raw monomers, an amount of the alkyl (meth) acrylate ester is from 60 to 99 parts by weight based on 100 parts by weight of the total amount of the raw monomers, and a total proportion of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.45 mmol/g in the raw monomers:

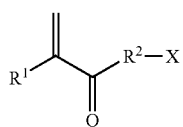
(1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3)

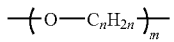    (2)

in the general formula (2), n represents an integer of 1 to 4, and m represents an integer of 2 or more, and

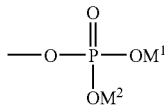    (3)

in the general formula (3), $M^1$ and $M^2$ each independently represents a hydrogen atom or a cation.

An adhesive optical film of the present invention comprises an optical film; an adhesive layer laminated on at least one surface of the optical film; and an under coat layer containing an oxazoline group-containing polymer, which is interposed between the optical film and the adhesive layer.

In the adhesive optical film of the present invention, the under coat layer is preferably made of a mixture of an oxazoline group-containing polymer and a polyamine-based polymer.

In the adhesive optical film of the present invention, the under coat layer is preferably made of a mixture of an oxazoline group-containing polymer and a compound having a plurality of carboxyl groups.

In the adhesive optical film of the present invention, the under coat layer is preferably made of a mixture of an oxazoline group-containing polymer, a polyamine-based polymer, and a compound having a plurality of carboxyl groups.

In the adhesive optical film of the present invention, the oxazoline group-containing polymer preferably has a principal chain being of an acryl skeleton, and has an oxazoline group in a side chain of the principal chain.

In the adhesive optical film of the present invention, the polyamine-based polymer preferably has a principal chain being of an acryl skeleton, and has a polyethyleneimine chain in a side chain of the principal chain.

In the adhesive optical film of the present invention, the compound having a plurality of carboxyl groups preferably has a number average molecular weight of 1000 or more.

In the adhesive optical film of the present invention, the under coat layer is preferably made of a water dispersible polymer.

In the adhesive optical film of the present invention, the adhesive layer is preferably made of an acrylic adhesive.

In the adhesive optical film of the present invention, the acrylic adhesive is preferably water dispersible.

In the adhesive optical film of the present invention, the adhesive layer preferably has a functional group which reacts with an oxazoline group and/or an amino group.

In the adhesive optical film of the present invention, the functional group, which reacts with an oxazoline group and/or an amino group, is preferably a carboxyl group.

The adhesive optical film of the present invention comprises an optical film, an adhesive layer laminated on at least one surface of the optical film, and an under coat layer interposed between the optical film and the adhesive layer, the adhesive layer being made of an adhesive composition comprising, as raw monomers, an alkyl (meth)acrylate ester whose alkyl group has 4 to 18 carbon atoms, a carboxyl group-containing vinyl monomer, a phosphoric acid group-containing vinyl monomer represented by the following general formula (1), and a copolymerizable vinyl monomer which is optionally copolymerizable with the above monomers, wherein, with respect to the proportion of the raw monomers, the amount of the alkyl (meth)acrylate ester is from 60 to 99 parts by weight based on 100 parts by weight of the total amount of the raw monomers, and the total proportion of the carboxyl group-containing vinyl monomer, the phosphoric acid group-containing vinyl monomer and the copolymerizable vinyl monomer is from 1 to 40 parts by weight, based on 100 parts by weight of the total amount of the raw monomers, and the carboxyl group concentration is from 0.05 to 1.50 mmol/g and the phosphoric acid group concentration is from 0.01 to 0.45 mmol/g in the raw monomers, and the under coat layer has an oxazoline group-containing monomer.

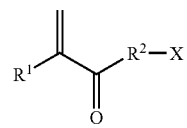    (1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3),

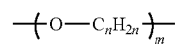    (2)

in the general formula (2), n represents an integer of 1 to 4, and m represents an integer of 2 or more, and

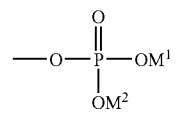    (3)

in the general formula (3), $M^1$ and $M^2$ each independently represents a hydrogen atom or a cation.

In the adhesive composition of the adhesive optical film of the present invention, with respect to the proportion of the raw monomers, the amount of the alkyl (meth)acrylate ester is preferably from 60 to 99 parts by weight, the amount of the carboxyl group-containing vinyl monomer is preferably from 0.5 to 15 parts by weight, the amount of the phosphoric acid group-containing vinyl monomer is preferably from 0.5 to 20 parts by weight, and the amount of the copolymerizable vinyl monomer is preferably 39 parts by weight or less, based on 100 parts by weight of the total amount of the raw monomers.

In the adhesive optical film of the present invention, it is preferable that the adhesive composition further contains, as the copolymerizable vinyl monomer, an alkoxysilyl group-containing vinyl monomer, the amount being from 0.001 to 1 parts by weight based on 100 parts by weight of the total amount of the raw monomers.

In the adhesive optical film of the present invention, the adhesive composition is preferably a water dispersible adhesive composition.

In the adhesive optical film of the present invention, the under coat layer is preferably made of a mixture of an oxazoline group-containing polymer and a compound having a plurality of carboxyl groups.

In the adhesive optical film of the present invention, preferably the oxazoline group-containing polymer has a principal chain being an acryl skeleton, and has an oxazoline group in a side chain of the principal chain.

In the adhesive optical film of the present invention, the compound having a plurality of carboxyl groups preferably has a number average molecular weight of 1000 or more.

The image display device of the present invention includes ab optical film an adhesive layer laminated on at least one surface of the optical film, and at least one adhesive optical film having an under coat layer interposed between the optical film and the adhesive layer, the adhesive layer being made of an adhesive composition comprising, as raw monomers, an alkyl (meth)acrylate ester whose alkyl group has 4 to 18 carbon atoms, a carboxyl group-containing vinyl monomer, a phosphoric acid group-containing vinyl monomer represented by the following general formula (1), and a copolymerizable vinyl monomer which is optionally copolymerizable with the above monomers, wherein with respect to a proportion of the raw monomers, an amount of the alkyl (meth) acrylate ester is from 60 to 99 parts by weight based on 100 parts by weight of the total amount of the raw monomers, and a total proportion of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.45 mmol/g in the raw monomers:

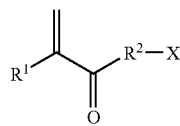

(1)

in the general formula (1), $R^1$ represents a hydrogen atom or a methyl group, $R^2$ represents a polyoxyalkylene group represented by the following general formula (2), and X represents a phosphoric acid group or a salt thereof represented by the following general formula (3)

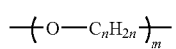

(2)

in the general formula (2), n represents an integer of 1 to 4, and m represents an integer of 2 or more, and

(3)

in the general formula (3), $M^1$ and $M^2$ each independently represents a hydrogen atom or a cation.

The adhesive composition of the present invention and the adhesive optical film comprising an adhesive layer made of the adhesive composition can achieve excellent adhesion because of high adhesion to a glass substrate.

Since the adhesive optical film of the present invention has high adhesion between an adhesive layer and an optical film, an occurrence of an adhesive residue and a lack of adhesive can be effectively suppressed when sticked onto a liquid crystal display.

Furthermore, since the adhesive composition of the present invention and the adhesive optical film comprising an adhesive layer made of the adhesive composition have excellent heat resistance and moist heat resistance, excellent durability can be obtained even in not only a high temperature atmosphere but also a high-temperature and high-humidity atmosphere.

Therefore, the image display device of the present invention comprising the adhesive optical film of the present invention can realize excellent durability.

DETAILED DESCRIPTION OF THE PREFERRED EMBODIMENT

Figure 1:
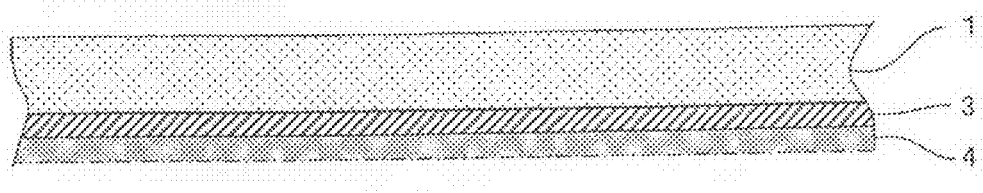
FIG. 1 is an enlarged sectional view showing an embodiment of an adhesive optical film according to the present invention.

The adhesive composition of the present invention is a water dispersible adhesive composition comprising, as raw monomers, an alkyl (meth)acrylate ester whose alkyl group has 4 to 18 carbon atoms, a carboxyl group-containing vinyl monomer, a phosphoric acid group-containing vinyl monomer represented by the following general formula (1), and a copolymerizable vinyl monomer which is optionally copolymerizable with the above monomers, wherein, with respect to the proportion of the raw monomers, an amount of the alkyl (meth)acrylate ester is from 60 to 99 parts by weight based on 100 parts by weight of the total amount of the raw monomers, and a total amount of the carboxyl group-containing vinyl monomer, the phosphoric acid group-containing vinyl monomer and the copolymerizable vinyl monomer is from 1 to 40 parts by weight based on 100 parts by weight of the total amount of the raw monomers, and a carboxyl group concentration is from 0.05 to 1.50 mmol/g and a phosphoric acid group concentration is from 0.01 to 0.95 mmol/g in the raw monomers:

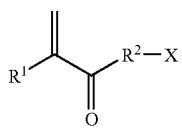

in the general formula (1), $R^1$ represents a hydrogen atom or a methyl group, $R^2$ represents a polyoxyalkylene group, and X represents a phosphoric acid group or a salt thereof.

The alkyl (meth)acrylate ester whose alkyl group has 4 to 18 carbon atoms may be an alkyl methacrylate ester and/or an alkyl acrylate ester, and examples thereof include alkyl (linear or branched alkyl having 4 to 18 carbon atoms) (meth) acrylate esters such as butyl (meth)acrylate, isobutyl (meth) acrylate, sec-butyl (meth)acrylate, t-butyl (meth)acrylate, pentyl (meth)acrylate, neopentyl (meth)acrylate, isoamyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate and octadecyl (meth)acrylate. These alkyl (meth)acrylate esters may be appropriately used alone or in combination. For example, a mixing ratio (weight ratio) is from 1/99 to 55/45 (butyl acrylate/2-ethylhexyl acrylate), and preferably from 5/95 to 60/40.

The amount of the alkyl (meth)acrylate ester is, for example, from 60 to 99 parts by weight, preferably 70 to 99 parts by weight, more preferably from 80 to 99 parts by weight, and particularly preferably from 80 to 98 parts by weight, based on 100 parts by weight of the total amount of the raw monomers.

The carboxyl group-containing vinyl monomer may be a vinyl monomer having a carboxyl group in the molecule, and examples thereof include unsaturated carboxylic acids such as (meth)acrylic acid, fumaric acid, maleic acid, itaconic acid, crotonic acid and cinnamic acid; unsaturated dicarboxylic acid monoesters such as monomethyl itaconate, monobutyl itaconate and 2-acryloyloxyethylphthalic acid; unsaturated tricarboxylic acid monoesters such as 2-methacryloyloxyethyltrimellitic acid and 2-methacryloyloxyethylpyromellitic acid; and carboxyalkyl acrylates such as β-carboxyethyl acrylate, carboxypentyl acrylate and ω-carboxy-polycaprolactone monoacrylate.

Examples of the carboxyl group-containing vinyl monomer include unsaturated dicarboxylic acid anhydrides such as itaconic anhydride, maleic anhydride and fumaric anhydride.

These carboxyl group-containing vinyl monomers are appropriately used alone or in combination.

The carboxyl group concentration of the carboxyl group-containing vinyl monomer in the raw monomers is, for example, from 0.05 to 1.50 mmol/g, and preferably from 0.20 to 0.90, mmol/g. To adjust the carboxyl group concentration of the carboxyl group-containing vinyl monomer within the above range, the proportion of the carboxyl group-containing vinyl monomer is set, for example, from 0.4 to 41 parts by weight, and preferably from 1.4 to 25 parts by weight, based on 100 parts by weight of the total amount of the raw monomers, although it varies depending on the molecular weight of the carboxyl group-containing vinyl monomer. The proportion of the carboxyl group-containing vinyl monomer can be adjusted, for example, from 0.5 to 15 parts by weight, preferably from 0.5 to 10 parts by weight, and more preferably from 1 to 10 parts by weight, based on 100 parts by weight of the total amount of the raw monomers, within the above carboxyl group concentration. When the amount is less than the above range, the cohesive force of the water dispersible adhesive composition decreases. On the other hand, when the amount is more than the above range, stability upon emulsion polymerization and water resistance of the water dispersible adhesive composition deteriorate.

The carboxyl group concentration of the carboxyl group-containing vinyl monomer is calculated by the following equation.

Carboxyl group concentration [mmol/g]=1000×{(mixture weight [g] of carboxyl group-containing vinyl monomer)/(molecular weight [g/mol] of carboxyl group-containing vinyl monomer)}/ (total weight [g] of raw monomers)

In the above equation, the total weight of the raw monomers is the weight which does not include water, initiators, emulsifiers, chain transfer agents and crosslinking agents, and additives such as viscosity modifiers described below.

The phosphoric acid group-containing vinyl monomer represented by the following general formula (1) is a polyalkylene oxide (meth)acrylate phosphate ester,

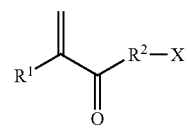

in the general formula (1), $R^1$ represents a hydrogen atom or a methyl group, $R^2$ represents a polyoxyalkylene group, and X represents a phosphoric acid group or a salt thereof.

The polyoxyalkylene group represented by $R^2$ is represented by the following general formula (2):

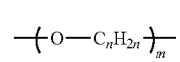

in the general formula (2), n represents an integer of 1 to 4, and m represents an integer of 2 or more, and examples thereof include polyoxyethylene group (in the general formula (2), n=2), polyoxypropylene group (in the general formula (2), n=3) and a random, block or graft unit thereof. The polymerization degree of these oxyalkylene groups, namely m in the general formula (2), is preferably 4 or more, and usually 40 or less.

When the polymerization degree of the oxyalkylene group is higher, mobility of a side chain of the phosphoric acid group increases, and interaction with glass rapidly proceeds, and thus adhesion of the water dispersible adhesive composition to a glass substrate is improved.

The phosphoric acid group or a salt thereof represented by X is represented by the following general formula (3):

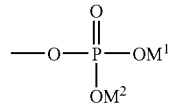

in the general formula (3), $M^1$ and $M^2$ each independently represents a hydrogen atom or a cation.

The cation is not specifically limited and examples thereof include inorganic cations of alkali metals such as sodium and potassium, and alkali earth metals such as calcium and magnesium; and organic cations of quaternary amines.

As the phosphoric acid group-containing vinyl monomer, commercially available products can be used, and examples thereof include mono[poly(ethylene oxide)methacrylate] phosphate esters such as Sipomer PAM-100 (manufactured by Rhodia Nicca, Ltd.), Phosmer PE (manufactured by Uni-Chemical Co., Ltd.), Phosmer PEH (manufactured by Uni-Chemical Co., Ltd.) and Phosmer PEDM (manufactured by Uni-Chemical Co., Ltd.); and mono[poly(propylene oxide) methacrylate]phosphate esters such as Sipomer PAM-200 (manufactured by Rhodia Nicca, Ltd.), Phosmer PP (manufactured by Uni-Chemical Co., Ltd.), Phosmer PPH (manufactured by Uni-Chemical Co., Ltd.) and Phosmer PPDM (manufactured by Uni-Chemical Co., Ltd.).

These phosphoric acid group-containing vinyl monomers are appropriately used alone or in combination.

The phosphoric acid group concentration of the phosphoric acid group-containing vinyl monomer in the raw monomers is, for example, from 0.01 to 0.45 mmol/g, and preferably from 0.02 to 0.20 mmol/g. To adjust the phosphoric acid group concentration of the phosphoric acid group-containing vinyl monomer within the above range, the proportion of the phosphoric acid group-containing vinyl monomer is set from 0.4 to 22 parts by weight, and preferably from 0.8 to 10 parts by weight, based on 100 parts by weight of the total amount of the raw monomers, although it varies depending on the molecular weight of the phosphoric acid group-containing vinyl monomer. The proportion of the phosphoric acid group-containing vinyl monomer can also be set from 0.5 to 20 parts by weight, preferably from 0.5 to 10 parts by weight, and more preferably from 1 to 5 parts by weight, based on 100 parts by weight of the total amount of the raw monomers, within the above phosphoric acid group concentration. When the amount is less than the above range, sufficient effect of improving adhesion to the glass substrate is not archived. On the other hand, when the amount is more than the above range, stability in emulsion polymerization may deteriorate and adhesion may deteriorate due to increased elastic modulus of the water dispersible adhesive composition.

The phosphoric acid group concentration of the phosphoric acid group-containing vinyl monomer is calculated by the following equation.

$$\text{Phosphoric acid group concentration [mmol/g]} = 1000 \times \{(\text{mixture weight [g] of phosphoric acid group-containing vinyl monomer})/(\text{molecular weight [g/mol] of phosphoric acid group-containing vinyl monomer})\}/(\text{total weight [g] of raw monomers})$$

The total weight of the raw monomers is the weight which does not include water, initiators, emulsifiers, chain transfer agents and crosslinking agents, and additives such as viscosity modifiers described below.

Examples of the copolymerizable vinyl monomer copolymerizable with the monomers include functional group-containing vinyl monomers other than carboxylic acid.

Examples of the functional group-containing vinyl monomer include vinyl carboxylate esters such as vinyl acetate and vinyl propionate; hydroxyl group-containing vinyl monomers such as 2-hydroxyethyl acrylate, 2-hydroxypropyl acrylate and 2-hydroxybutyl acrylate; amide group-containing unsaturated monomers such as (meth)acrylamide, N,N-dimethyl(meth)acrylamide, N,N-diethyl(meth)acrylamide, N-isopropyl(meth)acrylamide, N-butyl(meth)acrylamide, N-methoxymethyl(meth)acrylamide, N-methylol(meth) acrylamide, N-methylolpropane(meth)acrylamide and N-vinylcarboxylic acid amide; glycidyl group-containing unsaturated monomers such as glycidyl (meth)acrylate and methyl glycidyl (meth)acrylate; cyano group-containing unsaturated monomers such as acrylonitrile and methacrylonitrile; isocyanate group-containing unsaturated monomers such as 2-methacryloyloxyethyl isocyanate; sulfonic acid group-containing unsaturated monomers such as styrenesulfonic acid, allylsulfonic acid, 2-(meth)acrylamide-2-methylpropanesulfonic acid, (meth) acrylamidepropanesulfonic acid, sulfopropyl (meth)acrylate and (meth) acryloyloxynaphthalenesulfonic acid; maleimide-based monomers such as N-cyclohexylmaleimide, N-isopropylmaleimide, N-laurylmaleimide and N-phenylmaleimide; itaconimide-based monomers such as N-methylitaconimide, N-ethylitaconimide, N-butylitaconimide, N-octylitaconimide, N-2-ethylhexylitaconimide, N-cyclohexylitaconimide and N-laurylitaconimide; succinimide-based monomers such as N-(meth) acryloyloxymethylenesuccinimide, N-(meth)acryloyl-6-oxyhexamethylenesuccinimide and N-(meth)acryloyl-8-oxyoctamethylenesuccinimide; and glycol-based acryl ester monomers such as (meth)acrylic acid polyethylene glycol, (meth)acrylic acid polypropylene glycol, (meth)acrylic acid methoxyethylene glycol and (meth)acrylic acid methoxypolypropylene glycol.

Examples of the functional group-containing vinyl monomer include polyfunctional monomer.

Examples of the polyfunctional monomer include (mono or poly)alkylene glycol di(meth)acrylates, for example, (mono or poly)ethylene glycol di(meth)acrylates such as ethylene glycol di(meth)acrylate, diethylene glycol di(meth) acrylate, triethylene glycol di(meth)acrylate, trimethylolpropane tri(meth)acrylate and tetraethylene glycol di(meth) acrylate, and mono or poly)propylene glycol di(meth) acrylates such as propylene glycol di(meth)acrylate; neopentyl glycol di(meth)acrylate, 1,6-hexanediol di(meth) acrylate, pentaerythritol di(meth)acrylate, trimethylolpropane tri(meth)acrylate, pentaerythritol tri(meth)acrylate, dipentaerythritol hexa(meth)acrylate and divinyl benzene. Examples of the polyfunctional monomer include epoxy acrylate, polyester acrylate and urethane acrylate.

Examples of the copolymerizable vinyl monomer include the above functional group-containing vinyl monomers; aromatic vinyl monomers such as styrene; alkyl (linear or branched alkyl having 1 to 3 carbon atoms) (meth)acrylate esters such as methyl (meth)acrylate, ethyl (meth)acrylatee, propyl (meth)acrylate and isopropyl (meth)acrylate; (meth) acrylic acid alicyclic hydrocarbone esters such as cyclohexyl (meth)acrylate, bornyl (meth)acrylate and isobornyl (meth) acrylate; aryl (meth)acrylate esters such as phenyl (meth) acrylate; alkoxy group-containing unsaturated monomers such as methoxyethyl (meth)acrylate and ethoxyethyl (meth) acrylate; olefin-based monomers such as ethylene, propylene, isoprene, butadiene and isobutylene; vinyl ether-based monomers such as vinyl ether; halogen atom-containing unsaturated monomers such as vinyl chloride; vinyl group-containing heterocyclic compounds such as N-vinyl pyrrolidone, N-(1-methylvinyl) pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholin and tetrahydrofurfuryl (meth) acrylate; and acrylate ester-based monomers containing a halogen atom such as fluorine atom, such as fluorine (meth) acrylate.

Examples of the copolymerizable vinyl monomer include alkoxysilyl group-containing vinyl monomer. Examples of the alkoxysilyl group-containing vinyl monomer include silicone-based (meth)acrylate monomer and silicone-based vinyl monomer.

Examples of the silicone-based (meth)acrylate monomer include (meth)acryloyloxyalkyl-trialkoxysilanes such as (meth) acryloyloxymethyl-trimethoxysilane, (meth)acryloyloxymethyl-triethoxysilane, 2-(meth) acryloyloxyethyl-trimethoxysilane, 2-(meth)acryloyloxyethyl-triethoxysilane, 3-(meth) acryloyloxypropyl-trimethoxysilane, 3-(meth) acryloyloxypropyl-triethoxysilane, 3-(meth)acryloyloxypropyl-tripropoxysilane, 3-(meth)acryloyloxypropyl-triisopropoxysilane and 3-(meth)acryloyloxypropyl-tributoxysilane; (meth)acryloyloxyalkyl-alkyldialkoxysilanes such as (meth) acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 3-(meth) acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane and 3-(meth)acryloyloxypropyl-propyldiethoxysilane; and (meth)acryloyloxyalkyl-dialkyl (mono)alkoxysilanes corresponding to these monomers.

Examples of the silicone-based vinyl monomer include vinyltrialkoxysilanes such as vinyltrimethoxysilane, vinyltriethoxysilane, vinyltripropoxysilane, vinyltriisopropoxysilane and vinyltributoxysilane, and vinylalkyldialkoxysilane and vinyldialkylalkoxysilane corresponding to these monomers; vinylalkyltrialkoxysilanes such as vinylmethyltrimethoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane and γ-vinylpropyltributoxysilane, and (vinylalkyl)alkyldialkoxysilane and (vinylalkyl)dialkyl(mono)alkoxysilane corresponding to these monomers.

These copolymerizable vinyl monomers are appropriately used alone or in combination.

Among these copolymerizable vinyl monomers, an alkoxysilyl group-containing vinyl monomer is preferable.

By using the alkoxysilyl group-containing vinyl monomer as the copolymerizable vinyl monomer, alkoxysilyl groups are introduced in the polymer chain and a crosslinked structure can be formed by the reaction between them. Particularly in the water dispersible adhesive composition, since a ununiform crosslinked structure is formed in case of using the following described crosslinking agent, terminal peeling may more easily occur. However, when the alkoxysilyl group-containing monomer is used, a uniform crosslinked structure can be formed and thus adhesion and fixation to the glass substrate can be improved. Further, adhesion to the glass substrate can be enhanced by an interaction between the alkoxysilyl group and the glass substrate.

If necessary, the copolymerizable vinyl monomer is optionally mixed and the proportion thereof is, for example, 39 parts by weight or less, preferably 19 parts by weight or less, and more preferably 18 parts by weight or less, based on 100 parts by weight of the total amount of the raw monomers.

When the copolymerizable vinyl monomer is an alkoxysilyl group-containing vinyl monomer, the proportion thereof is, for example, from 0.001 to 1 parts by weight, preferably from 0.005 to 0.1 parts by weight, and more preferably from 0.01 to 0.1 parts by weight, based on 100 parts by weight of the total amount of the raw monomers. When the amount of the alkoxysilyl group-containing vinyl monomer is less than the above range, a cohesive force of the water dispersible adhesive composition decreases and adhesion between the water dispersible adhesive composition and the glass substrate can not be improved because of poor crosslinking due to the alkoxysilyl group. On the other hand, when the amount is more than the above range, stability in emulsion polymerization and adhesion may deteriorate.

The total amount of the carboxyl group-containing vinyl monomer, the phosphoric acid group-containing vinyl monomer and the copolymerizable vinyl monomer among the raw monomers described above is, for example, from 1 to 40 parts by weight, preferably from 1 to 30 parts by weight, more preferably from 1 to 20 parts by weight, and particularly preferably from 2 to 20 parts by weight, based on 100 parts by weight of the total amount of the raw monomers.

The water dispersible adhesive composition is prepared by copolymerizing the above raw monomers using a polymerization method such as emulsion polymerization.

In the emulsion polymerization, the above raw monomers, polymerization initiators, emulsifiers and, if necessary, chain transfer agents are appropriately mixed in water and then copolymerized. More specifically, known emulsion polymerization methods such as collective charging method (collective polymerization method), monomer dropping method and monomer emulsion dropping method can be employed. In the monomer dropping method, continuous dropping or divisional dropping is appropriately selected. Reaction conditions are appropriately selected, but the polymerization temperature is, for example, from 20 to 90° C.

The polymerization initiator is not specifically limited and a polymerization initiator, which is usually used in the emulsion polymerization, is used. Examples thereof include azo-based initiators such as 2,2'-azobisisobutyronitrile, 2,2'-azobis(2-methylpropioneamidine) disulfate, 2,2'-azobis(2-methylpropioneamidine) dihydrochloride, 2,2'-azobis(2-amidinopropane) dihydrochloride, 2,2'-azobis[N-(2-carboxyethyl)-2-methylpropioneamidine]hydrate, 2,2'-azobis(N,N'-dimethyleneisobutylamidine) and 2,2'-azobis[2-(2-imidazolin-2-yl)propane]dihydrochloride; persulfate-based initiators such as potassium persulfate and ammonium persulfate; peroxide-based initiators such as benzoyl peroxide, t-butyl hydroperoxide and hydrogen peroxide; substituted ethane-based initiators such as phenyl-substituted ethane; carbonyl-based initiator such as aromatic carbonyl compound; and redox-based initiator such as combination of persulfate and sodium hydrogen sulfite and combination of peroxide and sodium ascorbate.

These polymerization initiators are appropriately used alone or in combination.

Among these polymerization initiators, azo-based initiators are preferably used.

The amount of the polymerization initiator is appropriately selected and is from 0.005 to 1 parts by weight based on 100 parts by weight of the total amount of the raw monomers.

The dissolved oxygen concentration in the monomer solution may be decreased by replacing the atmosphere with nitrogen before or while mixing the polymerization initiator with the raw monomers.

The emulsifier is not specifically limited and a known emulsifier, which is usually used in the emulsion polymerization, is used. Examples thereof include anionic emulsifiers such as sodium lauryl sulfate, ammonium lauryl sulfate, sodium dodecylbenzenesulfonate, polyoxyethylene sodium lauryl sulfate, sodium polyoxyethylene alkyl ether sulfate, ammonium polyoxyethylene alkyl phenyl ether sulfate, sodium polyoxyethylene alkyl phenyl ether sulfate and sodium polyoxyethylene alkyl sulfosuccinate; and nonionic emulsifiers such as polyoxyethylene alkyl ether, polyoxyethylene alkyl phenyl ether, polyoxyethylene fatty acid ester and polyoxyethylene polyoxypropylene block polymer.

The emulsifier further includes radical polymerizable (reactive) emulsifiers (for example, HS-10 (manufactured by Dai-Ichi Kogyo Seiyaku Co., Ltd.) and LATEMUL PD-104 (manufactured by Kao Corporation)) in which a radical polymerizable functional group (reactive group) such as propenyl group or allyl ether group is introduced into the anionic emulsifier and the nonionic emulsifier.

These emulsifiers are appropriately used alone or in combination. The amount of the emulsifier is from 0.2 to 10 parts by weight, and preferably from 0.5 to 5 parts by weight, based on 100 parts by weight of the total amount of the raw monomers.

If necessary, the chain transfer agent is used to adjust a molecular weight of the water dispersible adhesive composition and a chain transfer agent, which is usually used in the emulsion polymerization, is used. Examples thereof include mercaptanes such as 1-dodecanethiol, mercaptoacetic acid, 2-mercaptoethanol, 2-ethylhexyl thioglycolate and 2,3-dimethylcapto-1-propanol.

These chain transfer agents are appropriately used alone or in combination. The proportion of the chain transfer agent is from 0.001 to 0.5 parts by weight based on 100 parts by weight of the total amount of the raw monomers.

The copolymer resulted from the above-mentioned emulsion polymerization can be prepared as an emulsion (water dispersion) of the water dispersible adhesive composition.

The water dispersible adhesive composition can also be prepared by polymerizing the raw monomers through a method of using no organic solvent other than the emulsion polymerization method, and dispersing the resulting polymer in water using the above emulsifier.

The water dispersible adhesive composition may be mixed with a crosslinking agent according to the purposes and applications. Examples of the crosslinking agent include isocyanate-based crosslinking agent, epoxy-based crosslinking agent, oxazoline-based crosslinking agent, aziridine-based crosslinking agent and metal chelate-based crosslinking agent. These crosslinking agents are not specifically limited and an oil soluble or water soluble crosslinking agent is used. These crosslinking agents are appropriately used alone or in combination. The proportion is, for example, from 0.1 to 10 parts by weight based on 100 parts by weight of the total amount of the raw monomers.

For the purpose of improving stability of the emulsion, a pH of the water dispersible adhesive composition is adjusted from 7 to 9, and preferably from 7 to 8, by ammonia water or the like.

Furthermore, additives, which are usually added to a water dispersible adhesive composition, such as viscosity modifiers and, if necessary, release modifiers, plasticizers, softeners, fillers, colorant (for example, pigments, dyes), antioxidant and surfactant may be appropriately added to the water dispersible adhesive composition. The proportion of these additives is not specifically limited and can be appropriately selected.

The viscosity modifier is not specifically limited and examples thereof include acrylic thickener.

The gel fraction of the water dispersible adhesive composition (solid content) is, for example, from 50 to 100% by weight, and preferably from 70 to 100% by weight. When the gel fraction is less than the above range, foaming and peeling may occur in case the water dispersible adhesive composition is applied to the adhesive optical film and the resulting product is used in a high-temperature and high-humidity atmosphere.

The gel fraction can be calculated by the following equation after the water dispersible adhesive composition was coated with a Teflon(trademark) sheet and immersed in ethyl acetate for 7 days.

Gel fraction(% by weighting)=(weight of water dispersible adhesive composition adhering to Teflon sheet after immersing/weight of water dispersible adhesive composition before immersing)×100

Also in case of bonding the water dispersible adhesive composition of the present invention to the glass substrate, the adhesive optical film can be firmly bonded to the glass substrate because of high adhesion.

The adhesive optical film of the present invention includes a first adhesive optical film comprising an adhesive layer made of the above adhesive composition and an optical film described hereinafter; and a second adhesive optical film comprising an optical film, an adhesive layer laminated on at least one side of the optical film and an under coat layer interposed between the optical film and the adhesive layer.

In the second adhesive optical film, an adhesive used in the adhesive layer is usually used in the adhesive layer, and examples thereof include acrylic adhesive and natural rubber latex-based adhesive. The adhesive is preferably an acrylic adhesive, and more preferably a water dispersible acrylic adhesive.

The acrylic adhesive contains an alkyl (meth)acrylate ester as its monomer component.

The alkyl (meth)acrylate ester includes a compound represented by the following general formula (4):

$$H_2C=CR^3COOR^4 \quad (4)$$

in the general formula (4), $R^3$ represents a hydrogen atom or a methyl group, and $R^4$ represents a linear or branched alkyl group having 1 to 18 carbon atoms.

Examples of the substituent represented by $R^4$ include methyl group, ethyl group, propyl group, isopropyl group, butyl group, isobutyl group, sec-butyl group, t-butyl group, pentyl group, neopentyl group, isoamyl group, hexyl group, heptyl group, octyl group, 2-ethylhexyl group, isooctyl group, nonyl group, isononyl group, decyl group, isodecyl group, undecyl group, dodecyl group, tridecyl group, tetradecyl group, pentadecyl group, hexadecyl group, heptadecyl group and octadecyl group.

The alkyl (meth)acrylate ester is specifically an alkyl methacrylate ester and/or an alkyl acrylate ester, and examples thereof include alkyl (linear or branched alkyl having 1 to 18 carbon atoms) (meth)acrylate esters such as methyl (meth)acrylate, ethyl (meth)acrylate, propyl (meth)acrylate, isopropyl (meth)acrylate, butyl (meth)acrylate, isobutyl (meth)acrylate, sec-butyl (meth)acrylate, t-butyl (meth)acrylate, pentyl (meth)acrylate, neopentyl (meth)acrylate, isoamyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate and octadecyl (meth)acrylate. These alkyl (meth)acrylate ester are appropriately used alone or in combination. For example, butyl acrylate may be used in combination with 2-ethylhexyl acrylate and the mixing ratio (weight ratio) is, for example, from 1/99 to 55/45 (butyl acrylate/2-ethylhexyl acrylate), and preferably from 5/95 to 60/40.

The proportion of the alkyl (meth)acrylate ester is 80 parts by weight or more, preferably 85 parts by weight or more, and more preferably 90 parts by weight or more, based on 100 parts by weight of the entire monomer components.

For the purpose of improving adhesion to the adherend of the adhesive layer by introducing a crosslink point (functional group) for thermal crosslinking, the acrylic adhesive preferably contains, as a monomer component, a functional group-containing monomer, in addition to the alkyl (meth)acrylate ester.

Examples of the functional group-containing monomer include carboxyl group-containing unsaturated monomers such as (meth)acrylic acid, itaconic acid, maleic acid, fumaric acid and crotonic acid; acid anhydride group-containing unsaturated monomers such as itaconic anhydride, maleic anhydride and fumaric anhydride; hydroxyl group-containing unsaturated monomers such as 2-hydroxyethyl acrylate, 2-hydroxypropyl acrylate and 2-hydroxybutyl acrylate; amide group-containing unsaturated monomers such as (meth)acrylamide, N,N-dimethyl(meth)acrylamide, N,N-diethyl(meth)acrylamide, N-isopropyl(meth)acrylamide, N-butyl(meth)acrylamide, N-methoxymethyl(meth)acrylamide, N-methylol(meth)acrylamide and N-methylolpropane (meth)acrylamide; amino group-containing unsaturated monomers such as aminoethyl (meth)acrylate, N,N-dimethylaminoethyl (meth)acrylate and t-butylaminoethyl (meth)acrylate; glycidyl group-containing unsaturated monomers such as glycidyl (meth)acrylate and methyl glycidyl (meth)acrylate; cyano group-containing unsaturated monomers such as (meth)acrylonitrile; maleimide group-containing monomers such as N-cyclohexylmaleimide, N-isopropylmaleimide, N-laurylmaleimide and N-phenylmaleimide; itaconimide group-containing monomers such as N-methylitaconimide, N-ethylitaconimide, N-butylitaconimide, N-octylitaconimide, N-2-ethylhexylitaconimide, N-cyclohexylitaconimide and N-laurylitaconimide; succinimide group-containing monomers such as N-(meth)acryloyloxymethylenesuccinimide, N-(meth)acryloyl-6-oxyhexamethylenesuccinimide and N-(meth)acryloyl-8-oxyoctamethylenesuccinimide; vinyl group-containing heterocyclic compounds such as N-vinyl pyrrolidone, N-(1-methylvinyl) pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine and (meth)acryloylmorpholine; sulfonic acid group-containing unsaturated monomers such as styrenesulfonic acid, allylsulfonic acid, 2-(meth)acrylamide-2-methylpropanesulfonic acid, (meth)acrylamidepropanesulfonic acid, sulfopropyl(meth)acrylate and (meth)acryloyloxynaphthalenesulfonic acid; phosphoric acid group-containing unsaturated monomers such as 2-hydroxyethylacryloyl phosphate; functional monomers such as 2-methacryloyloxyethyl isocyanate, and N-vinylcarboxylic acid amide.

The functional group-containing monomer further includes a polyfunctional monomer.

Examples of the polyfunctional monomer include the same as those described above.

These functional group-containing monomers are appropriately used alone or in combination.

Among these functional group-containing monomers, the carboxyl group-containing unsaturated monomers and acid anhydride group-containing unsaturated monomers are preferable. In carboxyl group-containing unsaturated monomers and acid anhydride group-containing unsaturated monomers, a carboxyl group contained in or generated from these monomers efficiently reacts with an oxazoline group of an oxazoline group-containing polymer constituting an under coat layer described hereinafter or an amino group of a polyamine-based polymer, and thus adhesion with the optical film can be enhanced.

The proportion of the functional group-containing monomer is from 0.5 to 12 parts by weight, and preferably from 1 to 8 parts by weight, based on 100 parts by weight of the alkyl (meth)acrylate ester.

For the purpose of improving various characteristics such as cohesive force, the acrylic adhesive may contain, as a monomer component, a copolymerizable monomer copolymerizable with the above alkyl (meth)acrylate ester.

Examples of the copolymerizable monomer include vinyl ester group-containing monomers such as vinyl acetate; aromatic unsaturated monomers such as styrene and vinyltoluene; (meth)acrylic acid alicyclic hydrocarbon ester monomers such as cyclopentyl di(meth)acrylate and isobornyl (meth)acrylate; (meth)acrylate ester monomers of polyhydric alcohol, such as neopentyl glycol di(meth)acrylate, hexanediol di(meth)acrylate, propylene glycol di(meth)acrylate, trimethylolpropane tri(meth)acrylate, tetramethylolmethane tri(meth)acrylate and dipentaerythritol hexa(meth)acrylate; alkoxy group-containing unsaturated monomer such as methoxyethyl (meth)acrylate and ethoxyethyl (meth)acrylate; olefin-based monomers such as ethylene, propylene, isoprene, butadiene and isobutylene; vinyl ether-based monomers such as vinyl ether; halogen atom-containing unsaturated monomers such as vinyl chloride; and a heterocycle such as tetrahydrofurfuryl (meth)acrylate, and fluorine (meth)acrylate, acrylate ester-based monomers containing a halogen atom.

Further, examples of the copolymerizable monomer include alkoxysilyl group-containing vinyl monomer. Examples of the alkoxysilyl group-containing vinyl monomer include silicone-based (meth)acrylate monomer and silicone-based vinyl monomer. Examples of the silicone-based (meth)acrylate monomer and the silicone-based vinyl monomer include the same as those described above.

By using the alkoxysilyl group-containing vinyl monomer as the copolymerizable vinyl monomer, an alkoxysilyl group is introduced into the polymer chain and a crosslinked structure can be formed by a reaction between them. Particularly in case of the acrylic adhesive, since a non-uniform crosslinked structure is formed by using a crosslinking agent described hereinafter, terminal peeling of the adhesive optical film is likely to occur when used in a high temperature atmosphere. However, when the alkoxysilyl group-containing monomer is used, a uniform crosslinked structure can be formed and thus adhesion and fixation to a glass substrate of such as a liquid crystal display can be improved. The alkoxysilyl group interacts with a glass substrate, thus making it possible to enhance adhesion to the glass substrate.

These copolymerizable monomers are appropriately used alone or in combination.

The proportion of the copolymerizable monomer is, for example, preferably 30 parts by weight or less, and preferably 15 parts by weight or less, based on 100 parts by weight of the alkyl (meth)acrylate ester.

The method for preparing an acrylic adhesive is not specifically limited and the acrylic adhesive is prepared by solution-polymerizing the above monomer component in an organic solvent or emulsion-polymerizing the monomer component in water.

In the emulsion polymerization, the above monomer component, polymerization initiators, emulsifiers, and, if necessary, chain transfer agents are appropriately mixed and polymerized in water. More specifically, known emulsion polymerization methods such as collective charging method (collective polymerization method), monomer dropping method and monomer emulsion dropping method can be employed. In the monomer dropping method, continuous dropping or divisional dropping is appropriately selected. The reaction conditions are appropriately selected and the polymerization temperature is, for example, from 20 to 90° C.

The polymerization initiator is not specifically limited and examples thereof include the same as those described above. These polymerization initiators are appropriately used alone or in combination. The proportion of the polymerization initiator is appropriately selected and is from 0.005 to 1 parts by weight based on 100 parts by weight of the entire monomer components.

As the emulsifier is not specifically limited and an emulsifier, which is usually used in the emulsion polymerization, is used. Examples thereof include the same anionic emulsifiers and nonionic emulsifiers as those described above.

These emulsifiers are appropriately used alone or in combination. The proportion of the emulsifier is, for example, from 0.2 to 10 parts by weight, and preferably from 0.5 to 5 parts by weight, based on 100 parts by weight of the entire monomer components.

The chain transfer agent is optionally used to adjust the molecular weight of the acrylic adhesive and a chain transfer agent, which is usually used in the emulsion polymerization, is used. Examples of the chain transfer agent include the same as those described above.

These chain transfer agents are appropriately used alone or in combination. The proportion of the chain transfer agent is from 0.001 to 0.5 parts by weight based on 100 parts by weight of the entire monomer components.

The acrylic adhesive can be prepared as a water dispersible acrylic adhesive, that is, a water dispersible emulsion (water dispersion) by the above emulsion polymerization.

The water dispersible acrylic adhesive can also be prepared by polymerizing the above monomer component through a method other than the emulsion polymerization and dispersing the resulting polymer in water using the above emulsifier.

The adhesive may be mixed with a crosslinking agent according to the purposes and applications. Examples of the crosslinking agent include the same as those described above. As crosslinking agents are not specifically limited a water soluble or oil soluble crosslinking agent is used. These crosslinking agents are appropriately used alone or in combination. The proportion is from 0.1 to 10 parts by weight based on 100 parts by weight of the entire raw monomer components.

When the adhesive is a water dispersible adhesive, for the purpose of improving stability of the emulsion, the pH is adjusted, for example, from 7 to 9, and preferably from 7 to 8, by ammonia water or the like.

Furthermore, additives, which are usually added to an adhesive, such as viscosity modifiers and, if necessary, release modifiers, plasticizers, softeners, fillers, colorant (for example, pigments, dyes), antioxidant and surfactant may be appropriately added to the adhesive. The proportion of these additives is not specifically limited and can be appropriately selected.

The viscosity modifier is not specifically limited and examples thereof include acrylic thickener.

The gel fraction of the solid content of the adhesive is, for example, from 50 to 100% by weight, and preferably from 70 to 100% by weight. When the gel fraction is less than the above range, foaming and peeling may occur in case the adhesive is applied to the adhesive optical film and the resulting product is used in a high-temperature and high-humidity atmosphere.

The gel fraction can be calculated in the same manner as described above.

In the second adhesive optical film, the adhesive may be the adhesive which is used in the first adhesive optical film, that is, the above adhesive composition of the present invention (corresponding to the third adhesive optical film in this case).

In the second adhesive optical film, the under coat layer contains at least an oxazoline group-containing polymer.

The oxazoline group-containing polymer has a principal chain being an acryl skeleton or a styrene skeleton, and has an oxazoline group in a side chain of the principal chain, and is preferably an oxazoline group-containing acrylic polymer which has a principal chain composed of an acryl skeleton and has an oxazoline group in a side chain of the principal chain.

Examples of the oxazoline group include 2-oxazoline group, 3-oxazoline group and 4-oxazoline group, and a 2-oxazoline group is preferable.

The 2-oxazoline group is generally represented by the following general formula (5):

in the general formula (5), $R^5$, $R^6$, $R^7$ and $R^8$ each independently represents a hydrogen atom, a halogen atom, an alkyl group, an aralkyl group, a phenyl group or a substituted phenyl group.

The number average molecular weight of the oxazoline group-containing polymer is, for example, 5000 or more, preferably 10000 or more and 1000000 or less. When the number average molecular weight is less than 5000, cohesive failure occurs because of poor strength of the under coat layer and an anchoring force may not be improved. On the other hand, when the number average molecular weight is more than 1000000, workability may be inferior. The oxazoline value of the oxazoline group-containing polymer is, for example, 1500 g solid/eq. or less, and preferably 1200 g solid/eq. or less. When the oxazoline value is more than 1500 g solid/eq., the amount of the oxazoline group contained in a molecule decreases and the anchoring force may not be improved.

Since the oxazoline group of the oxazoline group-containing polymer reacts with a functional group (for example, carboxyl group or hydroxyl group) contained in the adhesive at a comparatively low temperature, the oxazoline group-containing polymer reacts with the functional group in the adhesive layer and can firmly adhere to the adhesive layer when contained in the under coat layer.

Commercially available products are used as the oxazoline group-containing polymer, and specific examples thereof include oxazoline group-containing acrylic polymers such as EPOCROS WS-500 (aqueous solution type, solid content: 40%, principal chain: acrylic, pH 7 to 9, oxazoline value: 220 g solid/eq., manufactured by Nippon Shokubai Co., Ltd.) and EPOCROS WS-700 (aqueous solution type, solid content: 25%, principal chain: acrylic, pH 7 to 9, oxazoline value: 220 g solid/eq., manufactured by Nippon Shokubai Co., Ltd.); and oxazoline group-containing acryl/styrene-based polymers such as EPOCROS K-1000 series (emulsion type, solid content: 40%, principal chain: styrene/acrylic, oxazoline value: 1100 g solid/eq., pH 7 to 9, manufactured by Nippon Shokubai Co., Ltd.) and EPOCROS K-2000 series (emulsion type, solid content: 40%, principal chain: styrene/acrylic, pH 7 to 9, oxazoline value: 550 g solid/eq., manufactured by Nippon Shokubai Co., Ltd.). In view of an improvement in adhesion, an aqueous solution-type oxazoline group-containing acrylic polymer is preferable as compared with an emollition type acrylic polymer containing an emulsifier.

Such an oxazoline group-containing acrylic polymer is excellent in affinity with an adhesive, and therefore enhances adhesion between an optical film and an adhesive, and thus an adhesive optical film having excellent heat resistance can be obtained.

Such an oxazoline group-containing polymer is generally dissolved or water-dispersed in a solution such as organic solvent or water and is prepared as a resin solution or water dispersion containing the oxazoline group-containing polymer. In view of prevention of denaturation of the optical film, it is preferably prepared as a water dispersion.

In the adhesive optical film of the present invention, the under coat layer is preferably made of a mixture of an oxazoline group-containing polymer and a polyamine-based polymer.

The polyamine-based polymer is a polymer having a plurality of primary or secondary amino groups in the molecule, and examples thereof include polyethyleneimine; polyallylamine; and ethyleneimine-modified acrylic polymer and allylamine-modified acrylic polymer in which a principal chain composed of an acryl skeleton is contained and a polyethyleneimine chain represented by the following general formula (6) or a polyallylamine chain represented by the following general formula (7) is modified in a side chain of the principal chain. The ethyleneimine-modified acrylic polymer is preferable.

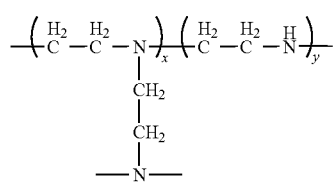

(6)

In the general formula (6), x and y represent the polymerization degree of a polyethyleneimine chain.

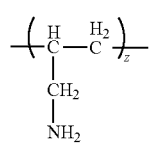

(7)

In the general formula (7), z represents the polymerization degree of a polyallylamine chain.

The number average molecular weight of the polyamine-based polymer is, for example, 200 or more, preferably 1000 or more, and more preferably 8000 or more, and usually 1000000 or less is preferred. When the number average molecular weight is less than 200, cohesive failure occurs because of poor strength of the under coat layer and the anchoring force may not be improved. On the other hand, when the number average molecular weight is more than 1000000, workability may be inferior. The amine hydrogen equivalent of the polyamine-based polymer is, for example, 1500 g solid/eq. or less, and preferably 1200 g solid/eq. or less. When the amine hydrogen equivalent is more than 1500 g solid/eq., the amount of the amino group contained in the molecule decreases and the anchoring force may not be improved.

Commercially available products are used as the polyamine-based polymer, and specific examples thereof include polyethyleneimines such as EPOMIN SP-003 (water soluble type, amine hydrogen equivalent: 47.6 g solid/eq., manufactured by Nippon Shokubai Co., Ltd.), EPOMIN SP-006 (water soluble type, amine hydrogen equivalent: 50.0 g solid/eq., manufactured by Nippon Shokubai Co., Ltd.), EPOMIN SP-012 (water soluble type, amine hydrogen equivalent: 52.6 g solid/eq., manufactured by Nippon Shokubai Co., Ltd.), EPOMIN SP-018 (water soluble type, amine hydrogen equivalent: 52.6 g solid/eq., manufactured by Nippon Shokubai Co., Ltd.), EPOMIN SP-103 (water soluble type, amine hydrogen equivalent: 52.6 g solid/eq., manufactured by Nippon Shokubai Co., Ltd.), EPOMIN SP-110 (water soluble type, amine hydrogen equivalent: 55.6 g solid/eq., manufactured by Nippon Shokubai Co., Ltd.), EPOMIN SP-200 (water soluble type, amine hydrogen equivalent: 55.6 g solid/eq., manufactured by Nippon Shokubai Co., Ltd.) and EPOMIN P-1000 (water soluble type, amine hydrogen equivalent: 52.6 g solid/eq., manufactured by Nippon Shokubai Co., Ltd.); and ethyleneimine-modified acrylic polymers such as POLYMENT SK-1000 (emulsion type, amine hydrogen equivalent: 650 g solid/eq., manufactured by Nippon Shokubai Co., Ltd.), POLYMENT NK-350 (solvent type, amine hydrogen equivalent: 1100 g solid/eq., manufactured by Nippon Shokubai Co., Ltd.), POLYMENT NK-380 (solvent type, amine hydrogen equivalent: 1100 g solid/eq., manufactured by Nippon Shokubai Co., Ltd.), POLYMENT NK-100PM (water soluble type, amine hydrogen equivalent: 350 to 450 g solid/eq., manufactured by Nippon Shokubai Co., Ltd.) and POLYMENT NK-200PM (water soluble type, amine hydrogen equivalent: 350 to 450 g solid/eq., manufactured by Nippon Shokubai Co., Ltd.).

The proportion of the polyamine-based polymer is, for example, from 50 to 98 parts by weight, preferably from 70 to 97 parts by weight, and more preferably from 80 to 95 parts by weight, based on 100 parts by weight of the total amount of the oxazoline group-containing polymer and the polyamine-based polymer. When the amount of the polyamine-based polymer is less than 50 parts by weight, moist heat resistance may be inferior. On the other hand, when the amount of the polyamine-based polymer is more than 98 parts by weight, heat resistance may be inferior.

Such mixture of the oxazoline group-containing polymer and the polyamine-based polymer is generally dissolved or water-dispersed in a solution such as organic solvent or water, and is prepared as a resin solution or water dispersion of the mixture of the oxazoline group-containing polymer and the polyamine-based polymer. Preferably, it is prepared as a water dispersible mixture (water dispersible polymer) of the oxazoline group-containing polymer and the polyamine-based polymer in which the mixture of them is water-dispersed.

When the under coat layer is made of the mixture of the oxazoline group-containing polymer and the polyamine-based polymer, excellent moist heat resistance can be imparted to the adhesive optical film while maintaining high adhesion and heat resistance in case the under coat layer is made of only the oxazoline group-containing polymer, and thus an adhesive optical film having high adhesion, heat resistance and moist heat resistance can be obtained.

It is considered that such an effect is exerted by the following reason. In addition to the effect of an increase in adhesion due to a hydrogen bond of the amino group contained in the polyamine-based polymer and an acid-base interaction, the under coat layer is crosslinked by the reaction between the oxazoline group-containing polymer and the polyamine-based polymer, thereby the under coat layer to be firm, and thus heat resistance and moist heat resistance are improved.

In the adhesive optical film of the present invention, the under coat layer is also preferably made of a mixture of the oxazoline group-containing polymer and the compound having a plurality of carboxyl groups.

Examples of the compound having a plurality of carboxyl groups include saturated low molecular compound having a plurality of carboxyl groups, for example, dicarboxylic acid compounds such as succinic acid, adipic acid and phthalic acid; and tricarboxylic acid compounds such as citric acid.

The compound having a plurality of carboxyl groups is a polymer compound, and examples thereof include polymers of unsaturated compounds such as acrylic acid and methacrylic acid (for example, polyacrylic acid and polymethacrylic acid). Copolymers of unsaturated compounds such as copolymer of acrylic acid and methacrylic acid, copolymer of acrylic acid and maleic acid, copolymer of methacrylic acid and maleic acid, and copolymer of acrylic acid, methacrylic acid and maleic acid. A copolymer of acrylic acid and maleic acid is preferable.

The number average molecular weight (measured by GPC in terms of standard polyethyleneglycol) of the compound having a plurality of carboxyl groups is 1000 or more, and preferably from 3000 to 200000.

All or portion of carboxyl groups of the compound having a plurality of carboxyl groups may form a salt with a cation.

Examples of the cation include inorganic cations such as potassium ion and sodium ion; and organic cations such as ammonium ion, and cations of primary amine, secondary amine and tertiary amine.

Commercially available products are usually used as the compound having a plurality of carboxyl groups, and specific examples thereof include POISE 532A (acrylic acid/maleic acid copolymer ammonium salt, number average molecular weight: about 10000, manufactured by Kao Corporation).

Such mixture of the oxazoline group-containing polymer and the compound having a plurality of carboxyl groups is generally dissolved or water-dispersed in a solution such as organic solvent or water, and is prepared as a resin solution or water dispersion of the mixture of the oxazoline group-containing polymer and the compound having a plurality of carboxyl groups. Preferably, it is prepared as a water dispersible mixture (water dispersible polymer) of the oxazoline group-containing polymer and the compound having a plurality of carboxyl groups in which the mixture of them is water-dispersed.

In case a water soluble material is used as the under coat layer, when the thickness of the under coat layer increases, the strength of the under coat layer may decrease when used in a high-humidity atmosphere and interlaminar fracture may occur. However, when the under coat layer is made of the mixture of the oxazoline group-containing polymer and the compound having a plurality of carboxyl groups, the under coat layer is crosslinked by a reaction between oxazoline groups of the oxazoline group-containing polymer and carboxyl groups of the compound having a plurality of carboxyl groups, thereby the under coat layer to be more firm, and thus heat resistance and moist heat resistance are improved and adhesion is enhanced.

The proportion of the compound having a plurality of carboxyl groups is, for example, from 1 to 30 parts by weight, preferably from 2 to 20 parts by weight, and more preferably from 3 to 10 parts by weight, based on 100 parts by weight of the total amount of the oxazoline group-containing polymer and the compound having a plurality of carboxyl groups. When the amount of the compound having a plurality of carboxyl groups is less than 1 part by weight, the effect of crosslinking the under coat layer may be lowered. On the other hand, when the amount of the compound having a plurality of carboxyl groups is more than 30 parts by weight, the under coat layer becomes opaque and optical characteristics may deteriorate.

Further, in the adhesive optical film of the present invention, under coat layer is also preferably made of a mixture of an oxazoline group-containing polymer, a polyamine-based polymer and a compound having a plurality of carboxyl groups.

The proportion of the polyamine-based polymer is, for example, from 50 to 98 parts by weight, preferably from 70 to 97 parts by weight, and more preferably from 80 to 95 parts by weight, based on 100 parts by weight of the total amount of the oxazoline group-containing polymer, the polyamine-based polymer and the compound having a plurality of carboxyl groups. When the polyamine-based polymer is less than 50 parts by weight, moist heat resistance may be inferior. On the other hand, when the amount of the polyamine-based polymer is more than 98 parts by weight, heat resistance may be inferior.

The proportion of the compound having a plurality of carboxyl groups is, for example, from 1 to 30 parts by weight, preferably from 2 to 20 parts by weight, and more preferably from 3 to 10 parts by weight, based on 100 parts by weight of the total amount of the oxazoline group-containing polymer, the polyamine-based polymer and the compound having a plurality of carboxyl groups. When the amount of the compound having a plurality of carboxyl groups is less than 1 part by weight, the effect of crosslinking the under coat layer may be lowered. On the other hand, when the amount of the compound having a plurality of carboxyl groups is more than 30 parts by weight, the under coat layer becomes opaque and optical characteristics may deteriorate.

Such mixture of the oxazoline group-containing polymer, the polyamine-based polymer and the compound having a plurality of carboxyl groups are generally dissolved or water-dispersed in a solution such as organic solvent or water, and is prepared as a resin solution or water dispersion of the mixture of the oxazoline group-containing polymer, the polyamine-based polymer and the compound having a plurality of carboxyl groups. Preferably, it is prepared as a water dispersible mixture (water dispersible polymer) of the oxazoline group-containing polymer, the polyamine-based polymer and the compound having a plurality of carboxyl groups in which the mixture of them is water-dispersed.

The optical film is not specifically limited as far as it is a firm which has optical characteristics and is sticked onto a liquid crystal display, and examples thereof include polarizing film, phase difference film, luminance improving film and view-angle expansion film.

A polarizing film to be used comprises a polarizer and a transparent protective film formed on one or both sides of the polarizer.

The polarizer is not specifically limited, and examples thereof include those obtained by dyeing hydrophilic polymer films such as polyvinyl alcohol-based film, partially formalated polyvinyl alcohol-based film and ethylene-vinyl acetate copolymer-based partially saponified film with a dichroic substance such as iodine or dichloric dye, followed by monoaxial stretching; and polyene-based oriented films subjected to a dehydration treatment of polyvinyl alcohol or a dehydrochlorination treatment of polyvinyl chloride. A polarizer obtained by dyeing a polyvinyl alcohol-based film with iodine, followed by monoaxial stretching is preferable.

Examples of the transparent protective film include polyester-based polymer film such as polyethylene terephthalate or polyethylene naphthalate, cellulose-based polymer film such as diacetyl cellulose or triacetyl cellulose, acrylic-based polymer film such as polymethyl methacrylate, styrene-based polymer film such as polystyrene or acrylonitrile-styrene copolymer (AS resin), and polycarbonate-based polymer film. The transparent protective film further includes polyolefin-based polymer film such as polyethylene, polypropylene, polyolefin having a cyclo or norbornene structure or ethylene-propylene copolymer, vinyl chloride-based polymer film, nylon, amide-based polymer film such as aromatic polyamide, imide-based polymer film, sulfone-based polymer film, polyethersulfone-based polymer film, polyether ether ketone-based polymer film, polyphenylene sulfide-based polymer film, vinyl alcohol-based polymer film, vinylidene chloride-based polymer film, vinyl butyral-based polymer film, allylate-based polymer film, polyoxymethylene-based polymer film, epoxy-based polymer film, or films such as a blend of the above polymers.

The transparent protective film can be formed as a cured layer made of an acrylic-based, urethane-based, acryl-urethane-based, epoxy-based or silicone-based thermosetting or ultraviolet curable resin.

The transparent protective film is preferably made of a cellulose-based polymer. The thickness of the transparent protective film is not specifically limited and is 500 μm or less, preferably from 1 to 300 μm, and more preferably from 5 to 200 μm.

The polarizer is bonded with the transparent protective film using an isocyanate-based adhesive, a polyvinyl alcohol-based adhesive, a gelatin-based adhesive, a vinyl-based adhesive, a latex-based adhesive or water-based polyester adhesive.

Examples of the phase difference film include double refraction film obtained by monoaxially or diaxially stretching a polymer material, oriented film of a liquid crystal polymer, and film comprising an oriented layer made f a liquid crystal polymer supported thereon. The thickness of the phase difference film is not specifically limited and is, for example, from 20 to 150 μm.

Examples of the polymer material include polyvinyl alcohol, polyvinyl butyral, polymethyl vinyl ether, polyhydroxyethyl acrylate, hydroxyethyl cellulose, hydroxypropyl cellulose, methyl cellulose, polycarbonate, polyallylate, polysulfone, polyethylene terephthalate, polyethylene naphthalate, polyether sulfone, polyphenylene sulfide, polyphenylene oxide, polyallyl sulfone, polyvinyl alcohol, polyamide, polyimide, polyolefin, polyvinyl chloride, cellulose-based polymer, or various two-dimensional or three-dimensional copolymers thereof, graft copolymer, and blends. These polymer materials are formed into an oriented substance (stretched film) by stretching.

Examples of the liquid crystal polymer include various principal chain or side chain type liquid crystal polymers in which a conjugated linear atomic group (mesogen) capable of imparting liquid crystal orientation is introduced into the principal chain or side chain of the polymer. The principal chain type liquid crystal polymer has a structure in which a methogen group is attached at the spacer moiety capable of imparting flexibility, and specific examples thereof include nematically oriented polyester-based liquid crystal polymer, discotic polymer and cholesteric polymer. Examples of the side chain type liquid crystal polymer include those which contain polysiloxane, polyacrylate, polymethacrylate or polymalonate as a principal chain skeleton and also has, as a side chain, a methogen moiety composed of a para-substituted cyclic compound unit capable of imparting nematic orientation via a spacer moiety composed of a conjugated atomic group. These liquid crystal polymers are obtained by spreading a solution of a liquid crystal polymer over an oriented surface such as the surface of a thin film made of polyimide or polyvinyl alcohol, formed on a glass plate subjected to a rubbing treatment, or to an oblique deposition with silicon oxide, followed by a heat treatment.

The phase difference film may be one used for the purpose of coloring or films having various wavelengths and a liquid crystal layer due to double refraction or enlarging a view angle, or may appropriately have phase difference according to the purposes, or optical characteristics such as phase difference may be controlled by laminating two or more phase difference films.

Examples of the luminance improving film include those which allow permeation of linear polarization of a predetermined polarizing axis and reflect other light, such as multilayered thin film of dielectrics or multilayered laminate composed of thin films each having different refractive index anisotropy; and those which allow permeation of either left-hand or right-hand circularly polarized light and reflects the other light, such as oriented film of a cholesteric liquid crystal polymer or a film comprising film base material and an oriented liquid crystal layer supported on the base material.

The view-angle expansion film is a film used to enlarge a view angle so that images can be seen comparatively clearly when viewed the image plane of the liquid crystal display from a slightly diagonal direction relative to the image plane, not from a perpendicular direction to the image plane, and examples thereof include phase difference film, oriented film made of liquid crystal polymer, and film comprising a transparent base material supported by an oriented layer such as a liquid crystal polymer. Examples of the phase difference film used as the view-angle expansion film include polymer film having double refraction obtained by biaxially stretched in the plane direction; polymer film having double refraction, in which refractive index in the thickness direction is controlled, obtained by monoaxially stretching in the plane direction and also under stretch in the thickness direction, and biaxially stretched film such as inclined oriented film.

The adhesive optical film of the present invention includes a third adhesive optical film described hereinafter, in addition to the adhesive optical films (first and second adhesive optical films).

A method for producing an adhesive optical film of the present invention will now be described by way of first, second and third adhesive optical films as examples with reference to FIG. 1 and FIG. 2.

First, an optical film 1 is prepared so as to obtain a first adhesive optical film.

As shown in FIG. 1, an adhesive layer 3 made of the water dispersible adhesive composition of the adhesive composition of the present invention is formed on one side of the optical film 1.

The adhesive layer 3 is formed, for example, by a method of transferring the adhesive layer 3 to the above optical film 1 from a release sheet 4 on which the adhesive layer 3 is formed. The release sheet 4 on which the adhesive layer 3 is formed is produced by directly coating the water dispersible adhesive composition on the release sheet 4 using a known coating method such as knife coating method, followed by drying. To transfer the adhesive layer 3, the release sheet 4 on which the adhesive layer 3 is formed is laminated with the optical film 1 and then the release sheet 4 is removed from the adhesive layer 3.

The adhesive layer 3 can also be formed, for example, by directly coating a water dispersible adhesive onto the optical film 1 using a known coating method such as knife coating method, followed by drying.

Figure 2:
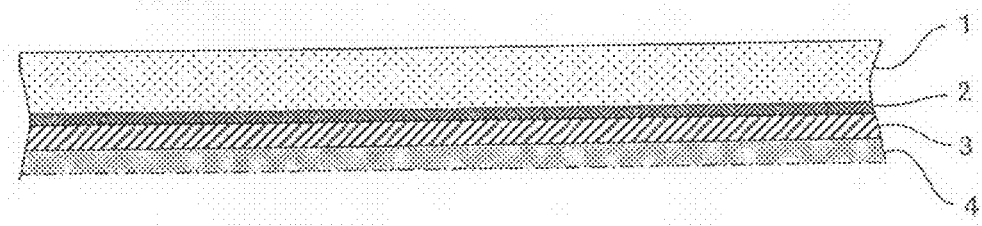
FIG. 2 is an enlarged sectional view showing another embodiment of an adhesive optical film according to the present invention.

As shown in FIG. 2, the optical film 1 may be provided with an under coat layer 2 so as to improve adhesion (anchoring force) with the adhesive layer 3.

The under coat layer 2 can be formed by appropriately subjecting to a conventional undercoating treatment, previously.

In the first adhesive optical film, there can also be used, as the under coat layer 2, an under coat layer 2 containing an oxazoline group-containing polymer used in the second adhesive optical film (corresponding to a third adhesive optical film described hereinafter in this case).

Examples of the release sheet 4 include paper; synthetic resin film made of paper, polyethylene, polypropylene or polyethylene terephthalate; rubber sheet; fabric; nonwoven fabric; net; foamed sheet; metal foil; and laminated sheet material thereof. If necessary, the surface of the release sheet 4 may be subjected to a treatment such as silicone treatment, long chain alkyl treatment or fluorine treatment so as to enhance releasability from the adhesive layer 3.

The thickness (thickness after drying) of the adhesive layer 3 is set within a range, for example, from 1 to 100 μm, preferably from 5 to 50 μm, and more preferably from 10 to 40 μm.

As described above, by forming the adhesive layer 3 made of the water dispersible adhesive composition on one side of the optical film 1, the first adhesive optical film can be obtained.

First, an optical film 1 is prepared so as to obtain a second adhesive optical film.

As shown in FIG. 2, an under coat layer 2 is formed on one side of the optical film 1. In this description, the under coat layer 2 is formed on one side of the optical film and, if necessary, may be formed on both sides of the optical film.

To form the under coat layer 2, a resin solution or water dispersion of an oxazoline group-containing polymer, a mixture of an oxazoline group-containing polymer and a polyamine-based polymer, a mixture of an oxazoline group-containing polymer and a compound having a plurality of carboxyl groups, or a mixture of an oxazoline group-containing polymer, a polyamine-based polymer and a compound having a plurality of carboxyl groups is directly coated onto the optical film 1 using a known coating method such as knife coating method, and then dried.

The thickness (thickness after drying) of the under coat layer 2 is set within a range, for example, from 1 to 500 nm, preferably from 10 to 450 nm, and more preferably from 20 to 400 nm. When the thickness of the under coat layer is set within the above range, it is possible to sufficiently increases adhesion between the optical film 1 and the adhesive layer 3.

Then, an adhesive layer 3 is formed on at least one side of the optical film 1 through the under coat layer 2.

The adhesive layer 3 is formed, for example, by the method of transferring adhesive layer 3 to the above under coat layer 2 from a release sheet 4 on which the adhesive layer 3 is formed. The release sheet 4 on which the adhesive layer 3 is formed by directly coating an adhesive onto the release sheet 4 using a known coating method such as knife coating method, followed by drying. To transfer the adhesive layer 3, the release sheet 4 on which the adhesive layer 3 is formed is laminated with the optical film 1 on which the under coat layer 2 is formed so as to contact the under coat layer 2 with the adhesive layer 3, and then the release sheet 4 is removed from the adhesive layer 3.

The adhesive layer 3 can also be formed, for example, by directly coating an adhesive onto the under coat layer 2 using a known coating method such as knife coating method, followed by drying.

Examples of the release sheet 4 include the same as those described above.

The thickness (thickness after drying) of the adhesive layer 3 is the same as that described above, and is preferably set within a range from 5 to 50 μm, and more preferably from 10 to 40 μm.

As described above, by forming the adhesive layer 3 made of an adhesive on at least one side of the optical film 1 with the under coat layer 2 interposed, a second adhesive optical film can be obtained.

First, an optical film 1 is prepared so as to obtain a third adhesive optical film.

An under coat layer 2 is formed on one side of the optical film 1. In this description, the under coat layer 2 is formed on one side of the optical film and, if necessary, the under coat layer is formed on both sides of the optical film (not shown).

To form the under coat layer 2, a resin solution or water dispersion of an oxazoline group-containing polymer, or a mixture of an oxazoline group-containing polymer and a compound having a plurality of carboxyl groups is directly coated onto the optical film 1 using a known coating method such as knife coating method, and then dried.

The thickness (thickness after drying) of the under coat layer 2 is set within a range, for example, from 1 to 500 nm, preferably from 10 to 450 nm, and more preferably from 20 to 400 nm. When the thickness of the under coat layer is set within the above range, it is possible to sufficiently increases adhesion between the optical film 1 and the adhesive layer 3.

Then, an adhesive layer 3 is formed on at least one side of the optical film 1 with the under coat layer 2 interposed.

Examples of the adhesive layer 3 include the same adhesive layer 3 which is provided on the above first film and is adhesive optical made of a water dispersible adhesive composition of an adhesive composition of the present invention.

The adhesive layer 3 is formed, for example, by the method of transferring adhesive layer 3 to the above under coat layer 2 from a release sheet 4 on which the adhesive layer 3 is formed. The release sheet 4, on which the adhesive layer 3 is formed, is produced by directly coating a water dispersible adhesive composition of an adhesive composition of the present invention onto the release sheet 4 using a known coating method such as knife coating method, followed by drying. To transfer the adhesive layer 3, the release sheet 4 on which the adhesive layer 3 is formed is laminated with the optical film 1 on which the under coat layer 2 is formed so as to contact the under coat layer 2 with the adhesive layer 3, and then the release sheet 4 is removed from the adhesive layer 3.

The adhesive layer 3 can also be formed, for example, by directly coating a water dispersible adhesive composition of an adhesive composition of the present invention onto the under coat layer 2 using a known coating method such as knife coating method, followed by drying.

Examples of the release sheet 4 include the same as those described above.

The thickness (thickness after drying) of the adhesive layer 3 is the same as that described above, and is preferably set within a range from 5 to 50 µm, and more preferably from 10 to 40 µm.

As described above, by forming an adhesive layer 3 made of the adhesive composition of the present invention on at least one side of the optical film 1 with the under coat layer 2 interposed, a third adhesive optical film can be obtained.

The adhesive optical film of the present invention is thus obtained advantageously used for various industrial purposes as a polarizing film, a phase difference film, a luminance improving film and a view-angle expansion film without deteriorating optical characteristics of the optical film.

Because of high adhesion between an adhesive layer and an optical film, in case of attaching the adhesive optical film to a liquid crystal display, even if the optical film is once removed from the liquid crystal display for positioning and then applied again (reworking), reworking can be conducted while effectively suppressing adhesive residue on removal. Therefore, efficient applying operation can be realized.

Even if the terminal portion of the adhesive optical film contacts with persons or articles in the vicinity in case of handling in the step of cutting or conveying the adhesive optical film, lack of adhesive can be effectively suppressed. Therefore, poor display of a liquid crystal display caused by lack of adhesive can be effectively prevented.

Further, since such an adhesive optical film has excellent heat resistance, when applied onto a liquid crystal display, decrease in adhesion with the liquid crystal display can be effectively prevented even in a high temperature atmosphere, and excellent durability can be obtained even in a high temperature atmosphere.

Furthermore, since such an adhesive optical film has excellent moist heat resistance, when applied onto a liquid crystal display, decrease in adhesion with the liquid crystal display can be effectively prevented even in a high temperature and high humidity atmosphere, and excellent durability can be obtained even in a high temperature and high humidity atmosphere.

Since the adhesive optical film of the present invention has excellent heat resistance and moist heat resistance, when sticked onto the surface of the glass substrate of an image display device, excellent durability can be obtained even in a high temperature atmosphere or a high temperature and high humidity atmosphere.

Therefore, by sticking the adhesive optical film thus obtained onto the surface of a glass substrate of image display devices such as a liquid crystal display, an organic electroluminescence device (organic EL display device) and a plasma display panel (PDP), image display devices having excellent durability can be obtained.

In a conventional water dispersible adhesive composition, a tackifying resin such as rosin-based resin or elastomer is added so as to enhance adhesion to an adherend. However, since the water dispersible adhesive composition used in the adhesive optical film of the present invention can enhance adhesion without adding the tackifying resin, regardless of water dispersibility, and thus it is possible to obtain an adhesive optical film comprising an adhesive layer made of a water dispersible adhesive composition, having high adhesion at low cost, and an image display device comprising such an adhesive optical film.

EXAMPLES

The present invention will now be described in more detail by way of Synthesis Examples, Examples and Comparative Examples. However, the present invention is not limited to the following Synthesis Examples, Examples and Comparative Examples. In the following description, parts and % are by weight standard unless otherwise specified.

Example 1

Preparation of Monomer Preemulsion

In a vessel, 100 parts of butyl acrylate, 5 parts of acrylic acid, 2 parts of mono[poly(propylene oxide)methacrylate] phosphate ester (average polymerization degree of propylene oxide: about 5.0) and 0.01 parts of 3-methacryloyloxypropyl-trimethoxysilane (KBM-503, manufactured by SHIN-ETSU CHEMICAL CO., LTD.) as raw monomers were charged and mixed to prepare a monomer mixture. To 627 g of the monomer mixture thus prepared, 13 g of a reactive emulsifier AQUALON HS-10 (Dai-Ichi Kogyo Seiyaku Co., Ltd.) and 360 g of ion-exchange water were added and the mixture was forcibly emulsified with stirring at 5000 (1/min) for 5 minutes using a homogenizer (manufactured by Tokusyu Kika Kogyo Co., Ltd.) to prepare a monomer preemulsion.

Preparation of Water Dispersible Adhesive Composition

In a reaction vessel equipped with a condenser tube, a nitrogen introducing tube, a thermometer and a stirrer, 200 g of the resulting monomer preemulsion and 330 g of ion-exchange water were charged, and after replacing the atmosphere in the reaction vessel by nitrogen, 0.2 g of 2,2'-azobis [N-(2-carboxyethyl)-2-methylpropioneamidine]hydrate (VA-057, manufactured by Wako Pure Chemicals Industries, Ltd.) was added, followed by polymerization at 60° C. for one hour. Then, 800 g of the residual monomer preemulsion was added dropwise in the reaction vessel over 3 hours, followed by polymerization for 3 hours. Furthermore, the polymerization was conducted at 60° C. for 3 hours while replacing the atmosphere by nitrogen to obtain an emulsion solution of a water dispersible adhesive composition having a solid content of 48%. After cooling the emulsion solution to room temperature, the pH was adjusted to 8 by adding 10% ammonia water and 3.0 g of an acrylic thickener ARON B-500 (manufactured by Toagosei Co., Ltd.) was added to prepare a water dispersible adhesive composition.

Preparation of Optical Film

A polyvinyl alcohol film (thickness: 80 µm) was stretched by 5 times as long as the original length in an aqueous iodine solution at 40° C., pulled up from the aqueous iodine solution and then dried at 50° C. for 4 minutes to obtain a polarizer. Using a polyvinyl alcohol-based adhesive, triacetyl cellulose film as a transparent protective film was bonded to both sides of the polarizer to obtain an optical film.

Preparation of Adhesive Optical Film

The resulting water dispersible adhesive composition was coated onto a release film (polyethylene terephthalate base material, DIAFOIL MRF38, manufactured by Mitsubishi Polyester Film Corp.), followed by a heat treatment at 100° C. for 2 minutes to form a 23 µm thick adhesive layer.

The adhesive layer thus formed was applied onto the surface of the optical film subjected previously to an undercoating treatment to obtain an adhesive optical film. The undercoating treatment was conducted by coating a solution, which was prepared by diluting a mixture (solid content: 1:1) of a water dispersible urethane resin (TAKERAK W511, manufactured by MITSUI TAKEDA CHEMICALS, INC.) and a water dispersible isocyanate-based curing agent (TAKENATE WD725, manufactured by MITSUI TAKEDA CHEMICALS, INC.) with a mixed solvent of water and ethanol (weight ratio: 1:1) so as to adjust the solid content to 2% by weight, onto one side of the optical film using a wire bar #5, and drying at 40° C. for 2 minutes.

Example 2

In the same manner as in Example 1, except that 2 parts of the mono[poly(propylene oxide)methacrylate]phosphate ester (average polymerization degree of propylene oxide: about 5.0) was replaced by 5 parts in Example 1, a water dispersible adhesive composition was prepared and then an adhesive optical film was produced.

Example 3

In the same manner as in Example 1, except that 2 parts of the mono[poly(propylene oxide)methacrylate]phosphate ester (average polymerization degree of propylene oxide: about 5.0) was replaced by 2 parts of a mono[poly(ethylene oxide)methacrylate]phosphate ester (average polymerization degree of ethylene oxide: about 5.5) in Example 1, a water dispersible adhesive composition was prepared and then an adhesive optical film was produced.

Example 4

In the same manner as in Example 1, except that 2 parts of the mono[poly(propylene oxide)methacrylate]phosphate ester (average polymerization degree of propylene oxide: about 5.0) was replaced by 2 parts of a mono[poly(propylene oxide)methacrylate]phosphate ester (average polymerization degree of propylene oxide: 5 to 6) in Example 1, a water dispersible adhesive composition was prepared and then an adhesive optical film was produced.

Example 5

In the same manner as in Example 1, except that 5 parts of acrylic acid was replaced by 11 parts of a β-carboxyethyl acrylate (Sipomer β-CEA, manufactured by Rhodia Nicca, Ltd.) in Example 1, a water dispersible adhesive composition was prepared and then an adhesive optical film was produced.

Example 6

In the same manner as in Example 1, except that 5 parts of acrylic acid was replaced by 21 parts of a w-carboxy-polycaprolactone monoacrylate (ARONIX M-5300, average polymerization degree of caprolactone group: about 2, manufactured by Toagosei Co., Ltd.) in Example 1, a water dispersible adhesive composition was prepared and then an adhesive optical film was produced.

Comparative Example 1

In the same manner as in Example 1, except that the mono[poly(propylene oxide)methacrylate]phosphate ester (average polymerization degree of propylene oxide: about 5.0) was not added in Example 1, a water dispersible adhesive composition was prepared and then an adhesive optical film was produced.

Comparative Example 2

In the same manner as in Example 1, except that 2 parts of the mono[poly(propylene oxide)methacrylate]phosphate ester (average polymerization degree of propylene oxide: about 5.0) was replaced by 2 parts of a mono[2-methacryloyloxyethyl]phosphate ester (polymerization degree of oxyethylene group: 1) in Example 1, a water dispersible adhesive composition was prepared and then an adhesive optical film was produced.

Comparative Example 3

In the same manner as in Example 1, except that 2 parts of the mono[poly(propylene oxide)methacrylate]phosphate ester (average polymerization degree of propylene oxide: about 5.0) was replaced by 2 parts of a mono[2-acryloyloxyethyl]phosphate ester (polymerization degree of oxyethylene group: 1) in Example 1, a water dispersible adhesive composition was prepared and then an adhesive optical film was produced.

Comparative Example 4

In the same manner as in Example 1, except that acrylic acid was not added and 2 parts of the mono[poly(propylene oxide)methacrylate]phosphate ester (average polymerization degree of propylene oxide: about 5.0) was replaced by 5 parts in Example 1, a water dispersible adhesive composition was prepared and then an adhesive optical film was produced.

Comparative Example 5

In the same manner as in Example 1, except that acrylic acid was not added and 2 parts of the mono[poly(propylene oxide)methacrylate]phosphate ester (average polymerization degree of propylene oxide: about 5.0) was replaced by 5 parts of a mono[poly(ethylene oxide)methacrylate]phosphate ester (average polymerization degree of ethylene oxide: about 5.5) in Example 1, a water dispersible adhesive composition was prepared and then an adhesive optical film was produced.

Comparative Example 6

A polymerization was conducted in the same manner as in Example 1, except that, in the preparation of the monomer preemulsion, 5 parts of acrylic acid was replaced by 20 parts and the mono[poly(propylene oxide)methacrylate]phosphate ester (average polymerization degree of propylene oxide: about 5.0) was not added in Example 1. However, since cohesion occurred during the polymerization, a water dispersible adhesive composition could not be obtained.

Comparative Example 7

A polymerization was conducted in the same manner as in Example 1, except that, in the preparation of the monomer preemulsion, acrylic acid was not added and 2 parts of the mono[poly(propylene oxide)methacrylate]phosphate ester (average polymerization degree of propylene oxide: about 5.0) was replaced by 25 parts of a mono[poly(ethylene oxide)methacrylate]phosphate ester (average polymerization degree of ethylene oxide: about 5.5) in Example 1. However, since cohesion occurred during the polymerization, a water dispersible adhesive composition could not be obtained.

TABLE 1

| Composition of raw monomer of water dispersible adhesive composition | | Average polymerization degree of oxyalkylene group | Example 1 | Example 2 | Example 3 | Example 4 | Example 5 | Example 6 |
|---|---|---|---|---|---|---|---|---|
| Alkyl (meth)acrylate ester | Butyl acrylate | — | 100 | 100 | 100 | 100 | 100 | 100 |
| Carboxyl group-containing vinyl monomer | Acrylic acid | — | 5 | 5 | 5 | 5 | — | — |
| | β-carboxyethyl acrylate (Sipomer β-CEA) | — | — | — | — | — | 11 | — |
| | ω-carboxy-polycaprolactone monoacrylate (ARONIX M-5300*1) | — | — | — | — | — | — | 21 |
| Phosphoric acid group-containing vinyl monomer | Mono[poly(propylene oxide)methacrylate]phosphate ester | about 5.0 | 2 | 5 | — | — | 2 | 2 |
| | Mono[poly(ethylene oxide)methacrylate]phosphate ester | about 5.5 | — | — | 2 | — | — | — |
| | Mono[poly(propylene oxide)methacrylate]phosphate ester | 5-6 | — | — | — | 2 | — | — |
| | Mono[2-methacryloyloxyethyl]phosphate ester | 1 | — | — | — | — | — | — |
| | Mono[2-acryloyloxyethyl]phosphate ester | 1 | — | — | — | — | — | — |
| Alkoxysilyl group-containing vinyl monomer | 3-methacryloyloxypropyl-trimethoxysilane | — | 0.01 | 0.01 | 0.01 | 0.01 | 0.01 | 0.01 |
| Carboxyl group concentration [mmol/g] | | | 0.65 | 0.63 | 0.65 | 0.65 | 0.68 | 0.62 |
| Phosphoric acid group concentration [mmol/g] | | | 0.04 | 0.10 | 0.05 | 0.04 | 0.04 | 0.04 |

| Composition of raw monomer of water dispersible adhesive composition | | Average polymerization degree of oxyalkylene group | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|
| Alkyl (meth)acrylate ester | Butyl acrylate | — | 100 | 100 | 100 | 100 | 100 | 100 | 100 |
| Carboxyl group-containing vinyl monomer | Acrylic acid | — | 5 | 5 | 5 | — | — | 20 | — |
| | β-carboxyethyl acrylate (Sipomer β-CEA) | — | — | — | — | — | — | — | — |
| | ω-carboxy-polycaprolactone monoacrylate (ARONIX M-5300*1) | — | — | — | — | — | — | — | — |
| Phosphoric acid group-containing vinyl monomer | Mono[poly(propylene oxide)methacrylate]phosphate ester | about 5.0 | — | — | — | 5 | — | — | — |
| | Mono[poly(ethylene oxide)methacrylate]phosphate ester | about 5.5 | — | — | — | — | 5 | — | 25 |
| | Mono[poly(propylene oxide)methacrylate]phosphate ester | 5-6 | — | — | — | — | — | — | — |
| | Mono[2-methacryloyloxyethyl]phosphate ester | 1 | — | 2 | — | — | — | — | — |
| | Mono[2-acryloyloxyethyl]phosphate ester | 1 | — | — | 2 | — | — | — | — |
| Alkoxysilyl group-containing vinyl monomer | 3-methacryloyloxypropyl-trimethoxysilane | — | 0.01 | 0.01 | 0.01 | 0.01 | 0.01 | 0.01 | 0.01 |
| Carboxyl group concentration [mmol/g] | | | 0.66 | 0.65 | 0.65 | 0.00 | 0.00 | 2.31 | 0.00 |
| Phosphoric acid group concentration [mmol/g] | | | 0.00 | 0.09 | 0.10 | 0.10 | 0.12 | 0.00 | 0.48 |

*1Average polymerization degree of caprolactone group: about 2

In Table 1, the composition of the monomer is represented by parts by weight. In Table 1, a carboxyl group concentration and a phosphoric acid group concentration are also shown.

In Table 1, the carboxyl group concentration was calculated on an assumption that a molecular weight of acrylic acid is 72, a molecular weight of β-carboxyethyl acrylate is 144 and a molecular weight (average molecular weight) of a o-carboxy-polycaprolactone monoacrylate (average polymerization degree of caprolactone group: about 2) is 276.

In Table 1, the phosphoric acid group concentration was calculated on an assumption that a molecular weight (average molecular weight) of a mono[poly(propylene oxide)methacrylate]phosphate ester (average polymerization degree of propylene oxide: about 5.0) is 456, a molecular weight (average molecular weight) of a mono[poly(ethylene oxide)methacrylate]phosphate ester (average polymerization degree of ethylene oxide: about 5.5) is 413.5, a molecular weight (average molecular weight) of a mono[poly(propylene oxide) methacrylate]phosphate ester (average polymerization degree of propylene oxide: 5 to 6) is 485, a molecular weight (average molecular weight) of a mono[2-methacryloyloxyethyl]phosphate ester (polymerization degree of oxyethylene group: 1) is 210 and a molecular weight (average molecular weight) of a mono[2-acryloyloxyethyl]phosphate ester (polymerization degree of oxyethylene group: 1) is 196.

Evaluation

1) Adhesion to Glass

Each of the adhesive optical films of Examples 1 to 6 and Comparative Examples 1 to 5 was cut into pieces having a width of 25 mm and the resulting cut film was sticked onto a glass plate (Corning #1737, manufactured by Corning Co.), and then they were contact-bonded during one reciprocation of a rubber roller having a load of 2 kg. The resulting specimen was allowed to stand in an autoclave at 50° C. under 0.5 MPa for 15 minutes and cooled to 25° C., and then a 90° peel adhesion (peel rate: 10 mm/min) was measured (initial adhesion).

The specimen was allowed to stand in the autoclave, allowed to stand in an atmosphere at 60° C. and an atmosphere at 60° C./90° RH for 40 hours and allowed to stand at 25° C. for one hour, and then a 90° peel adhesion (peel rate: 10 mm/min) was measured. The results are shown in Table 2.

The higher the peel adhesion is, the better adhesion to glass is.

2) Adhesion and Fixation of Adhesive Optical Film

Each of the adhesive optical films of Examples 1 to 6 and Comparative Examples 1 to 5 was cut into pieces measuring 235 mm×310 mm and the resulting cut film was sticked onto a 0.7 mm thick glass plate (CORNING #1737, manufactured by Corning Co.). The resulting specimen was allowed to stand in an autoclave at 50° C. under 0.5 MPa for 15 minutes, allowed to stand in an atmosphere at 90° C. and an atmosphere at 60° C./90° RH for 500 hours, and then it was visually observed whether or not peeling of the adhesive optical film occurred. The results are shown in Table 2.

The presence or absence of peeling of the adhesive optical film was evaluated according to the following criteria.

A: Change such as peeling was not observed.
B: Peeling in size of less than 1 mm was observed at the end of the adhesive optical film.
C: Peeling in size of 1 mm or more was observed at the end of the adhesive optical film.

3) Reworkability

Each of the adhesive optical films of Examples 1 to 6 and Comparative Examples 1 to 5 was cut into pieces having a width of 25 mm and the resulting cut film was sticked onto a glass plate (CORNING #1737, manufactured by Corning Co.), and then they were contact-bonded by one reciprocation of a rubber roller having a load of 2 kg. The resulting specimen was allowed to stand in an autoclave at 50° C. under 0.5 MPa for 15 minutes and cooled to 25° C., and then a 90° peel adhesion (peel rate: 300 mm/min) at 50% RH was measured (initial adhesion).

The specimen was allowed to stand in the autoclave, allowed to stand in an atmosphere at 60° C. for 40 hours, cooled to 25° C., and then a 90° peel adhesion (peel rate: 300 mm/min) was measured. The results are shown in Table 2.

The lower the peel adhesion is, the better reworkability is.

4) Gel Fraction

First, each of the water dispersible adhesive composition (about 100 mg) of Examples 1 to 6 and Comparative Examples 1 to 5 was wrapped with a Teflon sheet (trademark, product number: NTF-1122) and a kite string (12 cm), weights of which were previously measured, and the weight of the resulting parcel was measured. The parcel was placed in a 50 ml glass bottle and a sufficient amount of ethyl acetate was charged and, after sealing the glass bottle, the parcel was kept immersed at room temperature for 7 days. After pulling up the immersed parcel, ethyl acetate adhered to the Teflon sheet was wiped off and the parcel was dried at 130° C. for 2 hours by a drying machine. Thereafter, the weight of the dried parcel was measured. Then, the gel fraction was calculated by the following equation.

$$\text{Gel fraction}(\% \text{ by weight}) = \{(C-A)/(B-A)\} \times 100$$

The symbols in the equation are as follows.

A (g): total weight of a Teflon sheet and a kite string (tare weight)
B (g): total weight of a Teflon sheet, a kite string, and a water dispersible adhesive composition before being immersed in ethyl acetate and dryed
C (g): total weight of a Teflon sheet, a kite string, and a water dispersible adhesive composition after being immersed in ethyl acetate and dryed The measurement results are shown in Table 2.

TABLE 2

| Evaluation of physical properties | | | Example 1 | Example 2 | Example 3 | Example 4 | Example 5 | Example 6 |
|---|---|---|---|---|---|---|---|---|
| Adhesion to glass (peel adhesion [N/25 mm]) | Peel rate [10 mm/min.] | Initial | 2.5 | 2.0 | 2.0 | 2.4 | 2.2 | 2.0 |
| | | at 60° C. for 40 hours | 5.8 | 6.1 | 6.1 | 5.6 | 5.6 | 5.8 |
| | | at 60° C./90% RH for 40 hours | 5.1 | 9.0 | 8.9 | 4.9 | 5.1 | 9.0 |
| Adhesion and fixation of adhesive optical film | | Heat resistance (90° C.) | A | A | A | A | A | A |
| | | Moist heat resistance (60° C./90% RH) | A | A | A | A | A | A |

TABLE 2-continued

| | | | | | | | | |
|---|---|---|---|---|---|---|---|---|
| Reworkability (peel adhesion [N/25 mm]) | Peel rate [300 mm/min.] | Initial | 4.0 | 3.8 | 3.2 | 3.9 | 3.5 | 3.1 |
| | | at 60° C. for 40 hours | 17.8 | 16.0 | 14.5 | 18.3 | 17.3 | 11.8 |
| | | Gel fraction (%) | 91 | 97 | 93 | 89 | 93 | 96 |

| Evaluation of physical properties | | | Comp. Example 1 | Comp. Example 2 | Comp. Example 3 | Comp. Example 4 | Comp. Example 5 | Comp. Example 6 | Camp. Example 7 |
|---|---|---|---|---|---|---|---|---|---|
| Adhesion to glass (peel adhesion [N/25 mm]) | Peel rate [10 mm/min.] | Initial | 1.0 | 1.5 | 1.5 | 6.5 Adhesive residue | 9.0 Adhesive residue | Water dispersible adhesive composition could not be obtained because cohesion occurred during the polymerization. | |
| | | at 60° C. for 40 hours | 3.0 | 3.8 | 4.0 | 16.5 Adhesive residue | 16.0 Adhesive residue | | |
| | | at 60° C./90% RH for 40 hours | 0.8 | 2.9 | 3.2 | 4.6 Adhesive residue | 7.4 Adhesive residue | | |
| Adhesion and fixation of adhesive optical film | | Heat resistance (90° C.) | C | B | B | C | C | | |
| | | Moist heat resistance (60° C./90% RH) | B | A | A | C | C | | |
| Reworkability (peel adhesion [N/25 mm]) | Peel rate [300 mm/min.] | Initial | 2.1 | 2.1 | 2.3 | 3.4 | 3.4 | | |
| | | at 60° C. for 40 hours | 6.0 | 10.1 | 10.8 | 15.3 Adhesive residue | 17.5 Adhesive residue | | |
| | | Gel fraction (%) | 89 | 89 | 94 | 95 | 95 | | |

Synthesis Examples

Preparation of Water Dispersible Acrylic Adhesive

In a vessel, 95.2 parts of butyl acrylate, 4.76 parts of acrylic acid, 0.02 parts of 3-methacryloxypropyl-trimethoxysilane (KBM-503, manufactured by SHIN-ETSU CHEMICAL CO., LTD.), 2.0 parts (solid content) of a reactive emulsifier AQUALON HS-10 (manufactured by Dai-Ichi Kogyo Seiyaku Co., Ltd.) and 57.4 parts of water were charged and then mixed with stirring at 6000 min$^{-1}$ for 5 minutes using a homogenizer to prepare a monomer emulsion. In another vessel, 0.1 parts of 2,2'-azobis[N-(2-carboxyethyl)-2-methylpropioneamidine]hydrate (VA-057, manufactured by Wako Pure Chemicals Industries, Ltd.) was dissolved in water to prepare an aqueous 10% initiator solution.

In a reaction vessel equipped with a condenser tube, a nitrogen introducing tube, a thermometer and a stirrer, 52.3 parts of water, a 30% amount of the resulting aqueous 10% initiator solution and a 20% amount of the resulting monomer emulsion were charged and then emulsion-polymerized with stirring at 59° C. for one hour. The entire amount (70% amount) of the residual aqueous 10% initiator solution was added and the entire amount (80% amount) of the residual monomer emulsion was added over 3 hours with stirring, and then the mixture was reacted for 3 hours. After cooling the reaction solution to 30° C. or lower, the pH of the reaction solution was adjusted to 8 by adding 10% ammonia water to obtain a water dispersible acrylic adhesive.

Formation of Adhesive Layer

The water dispersible acrylic adhesive was coated onto a release film (polyethylene terephthalate base material, DIAFOIL MRF38, manufactured by Mitsubishi Polyester Film Corp.) in a dry thickness of 21 μm and then dried in a hot-air circulating oven at 100° C. for 2 minutes to form an adhesive layer on the release film.

Preparation of Optical Film

A polyvinyl alcohol film (thickness: 80 μm) was stretched by 5 times as long as the original length in an aqueous iodine solution at 40° C., pulled up from the aqueous iodine solution and then dried at 50° C. for 4 minutes to obtain a polarizer. Using a polyvinyl alcohol-based adhesive, triacetyl cellulose film as a transparent protective film was bonded to both sides of the polarizer to obtain an optical film.

Example 7

EPOCROS WS-700 (oxazoline group-containing acrylic polymer, manufactured by Nippon Shokubai Co., Ltd.) was diluted with a solution mixture of water and ethanol (volume ratio: 1:1) to prepare an undercoating agent solution having a solid content of 2%. This undercoating agent solution was coated onto one side of an optical film using a mayer bar #5 and then dried at 40° C. for 2 minutes to form an under coat layer. Then, a release film formed with an adhesive layer was laminated on one side of the optical film provided with the under coat layer to produce an adhesive optical film.

Example 8

In the same manner as in Example 7, except that EPOCROS WS-700 (oxazoline group-containing acrylic polymer, manufactured by Nippon Shokubai Co., Ltd.) used to prepare the undercoating agent solution was replaced by EPOCROS WS-500 (oxazoline group-containing acrylic polymer, manufactured by Nippon Shokubai Co., Ltd.), an adhesive optical film was produced.

Example 9

In the same manner as in Example 7, except that the solid content of 2% of the undercoating agent solution was replaced by 5%, an adhesive optical film was produced.

Example 10

In the same manner as in Example 7, except that, in the preparation of the undercoating agent solution of Example 7, EPOCROS WS-700 (oxazoline group-containing acrylic polymer, manufactured by Nippon Shokubai Co., Ltd.) used to prepare the undercoating agent solution was replaced by a mixtured solution mixture (mixing ratio is 5:95 in terms of a solid content ratio) of EPOCROS WS-700 (oxazoline group-containing acrylic polymer, manufactured by Nippon Shokubai Co., Ltd.) and POLYMENT SK-1000 (ethyleneimine-modified acrylic polymer, manufactured by Nippon Shokubai Co., Ltd.), and the mixtured solution mixture of water and ethanol (volume ratio: 1:1) was replaced by water, an undercoating agent solution was prepared and an adhesive optical film was produced.

Example 11

In the same manner as in Example 7, except that, in the preparation of the undercoating agent solution of Example 7, EPOCROS WS-700 (oxazoline group-containing acrylic polymer, manufactured by Nippon Shokubai Co., Ltd.) used to prepare the undercoating agent solution was replaced by a mixtured solution (mixing ratio is 95:5 in terms of a solid content ratio) of EPOCROS WS-700 (oxazoline group-containing acrylic polymer, manufactured by Nippon Shokubai Co., Ltd.) and POISE 532A (acrylic acid-maleic acid copolymer ammonium salt, number average molecular weight: about 10000, manufactured by Kao Corporation), and the mixtured solution of water and ethanol (volume ratio: 1:1) was replaced by water, an undercoating agent solution was prepared and an adhesive optical film was produced.

Example 12

In the same manner as in Example 7, except that, in the preparation of the undercoating agent solution of Example 7, EPOCROS WS-700 (oxazoline group-containing acrylic polymer, manufactured by Nippon Shokubai Co., Ltd.) used to prepare the undercoating agent solution was replaced by a mixtured solution(mixing ratio is 5:90:5 in terms of a solid content ratio) of EPOCROS WS-700 (oxazoline group-containing acrylic polymer, manufactured by Nippon Shokubai Co., Ltd.), POLYMENT SK-1000 (ethyleneimine-modified acrylic polymer, manufactured by Nippon Shokubai Co., Ltd.) and POISE 532A (acrylic acid-maleic acid copolymer ammonium salt, number average molecular weight: about 10000, manufactured by Kao Corporation), and the mixtured solution of water and ethanol (volume ratio: 1:1) was replaced by water, an undercoating agent solution was prepared and an adhesive optical film was produced.

Example 13

In the same manner as in Example 7, except that the solid content of 2% of the undercoating agent solution was replaced by 0.25%, adhesive optical film was produced.

Comparative Example 8

In the same manner as in Example 7, except that EPOCROS WS-700 (oxazoline group-containing acrylic polymer, manufactured by Nippon Shokubai Co., Ltd.) used to prepare the undercoating agent solution was replaced by a water dispersible urethane resin TAKERAK W-511 (MITSUI TAKEDA CHEMICALS, INC.), an adhesive optical film was produced.

Comparative Example 9

In the same manner as in Example 7, except that EPOCROS WS-700 (oxazoline group-containing acrylic polymer, manufactured by Nippon Shokubai Co., Ltd.) used to prepare the undercoating agent solution was replaced by a water dispersible polyester-based resin VYLON TAD-1000 (manufactured by Toyobo., Ltd.), an adhesive optical film was produced.

Comparative Example 10

In the same manner as in Example 7, except that EPOCROS WS-700 (oxazoline group-containing acrylic polymer, manufactured by Nippon Shokubai Co., Ltd.) used to prepare the undercoating agent solution was replaced by a water dispersible vinyl acetate-based resin BONCOAT 9180 (Manufactured by DAINIPPON INK AND CHEMICALS, INC.), an adhesive optical film was produced.

Comparative Example 11

In the same manner as in Example 7, except that EPOCROS WS-700 (oxazoline group-containing acrylic polymer, manufactured by Nippon Shokubai Co., Ltd.) used to prepare the undercoating agent solution was replaced by a carbodiimide group-containing water dispersible acrylic resin CARBODILITE E-01 (manufactured by Nisshinbo Industries, Inc.), an adhesive optical film was produced.

Comparative Example 12

In the same manner as in Example 7, except that, in the preparation of the undercoating agent solution of Example 7, EPOCROS WS-700 (oxazoline group-containing acrylic polymer, manufactured by Nippon Shokubai Co., Ltd.) used to prepare the undercoating agent solution was replaced by POLYMENT SK-1000 (ethyleneimine-modified acrylic polymer, manufactured by Nippon Shokubai Co., Ltd.), and the mixtured solution of water and ethanol (volume ratio: 1:1) was replaced by water, an undercoating agent solution was prepared and an adhesive optical film was produced.

Comparative Example 13

In the same manner as in Example 7, except that the under coat layer was not formed, an adhesive optical film was produced.

Evaluation

5) Thickness of Under Coat Layer

In Examples 7 to 13 and Comparative Examples 8 to 13, each adhesive optical film provided with only an under coat layer was stained with an aqueous 2% ruthenic acid solution for 2 minutes, embedded in an epoxy resin and then the epoxy resin was cut into pieces having a thickness of about 80 nm using an ultramicrotome (Ultracut S, manufactured by Leica Co.). Then, the thickness of the under coat layer was determined by observing a cross section of a slice of the optical film by TEM (Hitachi H-7650, acceleration voltage: 100 kV). The results are shown in Table 3.

6) Haze

In Examples 7 to 13 and Comparative Examples 8 to 13, each optical film provided with only an under coat layer (that is, adhesive optical film before forming an adhesive layer) was cut into pieces measuring 50 mm×50 mm and haze was measured by a haze computer HZ-1 (Suga Test Instruments Co., Ltd.). The results are shown in Table 3. Usually, the haze is preferably 2.0 or less. When the haze exceeds 2%, the optical film gives white appearance due to visual observation, and this is not preferable.

7) Adhesion Between Adhesive Layer and Optical film

Each of the adhesive optical films of Examples 7 to 13 and Comparative Examples 8 to 13 was cut into pieces measuring 25 mm×120 mm to obtain a sample. This sample was aged in an atmosphere at 23° C./60% RH, an atmosphere at 50° C. and an atmosphere at 60° C./90% RH for one day, respectively. After aging, a release film was removed and a polypropylene porous membrane was applied onto the adhesive surface of the sample and an adhesive tape (No. 31B, manufactured by Nitto Denko Corporation) was sticked onto the polypropylene porous membrane, to reinforce the sample. Then, the sample was allowed to stand in an atmosphere at 23° C./60% RH for 24 hours. Using a double-faced tape, a SUS304 steel plate was attached onto the back surface of the adhesive optical film after standing. Using a tensile testing machine, the polypropylene porous membrane and the adhesive tape (No. 31B) were removed in a 180° direction at a rate of 300 mm/min. After confirming that the adhesive layer adheres to the side of the polypropylene porous membrane, a peel stress was measured. The results are shown in Table 3. Usually, the adhesion was preferably 5.0 N/25 mm or more.

8) Heat Resistance

Each of the adhesive optical films of Examples 7 to 13 and Comparative Examples 8 to 13 was cut into pieces measuring 230 mm×310 mm to obtain a sample. This sample was sticked onto a glass plate (thickness: 0.7 mm, CORNING #1737, manufactured by Corning Co.) at the adhesive surface and then allowed to stand in an atmosphere at 50° C. at 0.5 MPa for 15 minutes. This sample was stored at 90° C. for 500 hours and it was visually observed whether or not peeling of the adhesive optical film occurred. The results are shown in Table 3.

In Table 3, the symbol "A" indicates that defects such as lifting and peeling are not observed, "B" indicates that peeling in size of less than 1 mm is observed, and "C" indicates that peeling in size of 1 mm or more is observed 9) Moist Heat Resistance Each of the adhesive optical films of Examples 7 to 13 and Comparative Examples 8 to 13 was cut into pieces measuring 230 mm×310 mm to obtain a sample. This sample was sticked onto a glass plate (thickness: 0.7 mm, CORNING #1737, manufactured by Corning Co.) at the adhesive surface and then allowed to stand in an atmosphere at 50° C. at 0.5 MPa for 15 minutes. This sample was stored at 60° C./90% RH for 500 hours and it was visually observed whether or not peeling of the adhesive optical film occurred. The results are shown in Table 3.

In Table 3, the symbol "A" indicates that defects such as lifting and peeling are not observed, "B" indicates that peeling in size of less than 1 mm is observed, and "C" indicates that peeling in size of 1 mm or more is observed.

TABLE 3

|  |  | Example 7 | Example 8 | Example 9 | Example 10 | Example 11 | Example 12 | Example 13 |
|---|---|---|---|---|---|---|---|---|
| Undercoat layer Thickness [nm] | | 175 | 175 | 285 | 175 | 175 | 175 | 50 |
| Haze [%] | | 0.6 | 0.5 | 0.6 | 0.6 | 0.8 | 0.8 | 0.6 |
| Adhesion [N/25 mm] | 23° C./60% RH | 9.7 | 10.0 | 8.7 | 11.3 | 11.7 | 10.5 | 9.6 |
| | 50° C. | 16.0 | 17.3 | 15.4 | 16.0 | 20.0 | 17.5 | 15.8 |
| | 60° C./90% RH | 2.0 | 1.1 | 0.5 | 15.0 | 15.1 | 10.2 | 8.8 |
| Heat resistance | 90° C. | A | A | A | A | A | A | A |
| Moist heat resistance | 60° C./90% RH | C | C | C | A | C | C | C |

|  |  | Comp. Example 8 | Comp. Example 9 | Comp. Example 10 | Comp. Example 11 | Comp. Example 12 | Comp. Example 13 |
|---|---|---|---|---|---|---|---|
| Undercoat layer Thickness [nm] | | 175 | 175 | 175 | 175 | 175 | — |
| Haze [%] | | 0.4 | 0.5 | 22.3 | 6.9 | 0.6 | 0.5 |
| Adhesion [N/25 mm] | 23° C./60% RH | 9.1 | 6.8 | 1.6 | 4.1 | 11.6 | 3.6 |
| | 50° C. | 10.1 | 7.0 | 2.1 | 4.8 | 11.0 | 3.2 |
| | 60° C./90% RH | 8.5 | 4.6 | 1.0 | 2.2 | 10.3 | 2.5 |
| Heat resistance | 90° C. | C | C | C | C | B | C |
| Moist heat resistance | 60° C./90% RH | B | C | C | C | B | C |

As is apparent from the results shown in Table 3, the adhesive optical films of Examples 7 to 13 can attain high adhesion between the adhesive layer and the optical film and can attain high adhesion even when aged by heating as compared with the adhesive optical film provided with no under coat layer of Comparative Example 13 and the adhesive optical films provided with the other under coat layer of Comparative Examples 8 to 12. Also the adhesive optical films of the Examples 7 to 13 are excellent in heat resistance. The adhesive optical film of Example 10 in which an oxazoline group-containing acryl polymer is used in combination with a polyamine-based polymer in an under coat layer is excellent in moist heat resistance as compared with the adhesive optical films of Examples 7 to 9 in which an oxazoline group-containing acryl polymer is used alone. The adhesive optical film of Comparative Example 12 in which a polyamine-based polymer is used alone is a little excellent in both heat resistance and moist heat resistance as compared with the adhesive optical films of Comparative Examples 8 to 11 and 13. The adhesive optical film of Example 10 in which an oxazoline group-containing acryl polymer is used in combination is excellent in not only heat resistance but also moist heat resistance.

When comparing a thin under coat layer of Example 13 with a thick under coat layer of Examples 7 to 9, the adhesion decreases due to aging with heating and humidifying when the thickness of the under coat layer increases, and the adhesion does not decrease when the under coat layer is thin.

When comparing the adhesive optical films of Examples 11 and 12 in which an oxazoline group-containing acryl polymer is used in combination with a compound having a plurality of carboxyl groups in an under coat layer with the adhesive optical films of Examples 7 to 9 in which an oxazoline group-containing acryl polymer is used alone, the adhesion does not decrease even when the under coat layer is thick and the adhesion increases particularly due to aging with heating and humidifying.

Example 14

Preparation of Monomer Preemulsion

In a vessel, 100 parts of butyl acrylate, 5 parts of acrylic acid, 2 parts of mono[poly(propylene oxide)methacrylate] phosphate ester (average polymerization degree of propylene oxide: about 5.0) and 0.01 parts of 3-methacryloyloxypropyl-trimethoxysilane (KBM-503, manufactured by SHIN-ETSU CHEMICAL CO., LTD.) as raw monomers were charged and mixed to prepare a monomer mixture. To 627 g of the monomer mixture thus prepared, 13 g (2 parts (solid content)) of AQUALON HS-10 (Dai-Ichi Kogyo Seiyaku Co., Ltd.) as an emulsifier and 360 g of ion-exchange water were added and the mixture was forcibly emulsified with stirring at 5000 (1/min) for 5 minutes using a homogenizer (manufactured by Tokusyu Kika Kogyo Co., Ltd.) to prepare a monomer preemulsion.

Preparation of Water Dispersible Adhesive Composition

In a reaction vessel equipped with a condenser tube, a nitrogen introducing tube, a thermometer and a stirrer, 200 g of the resulting monomer preemulsion and 330 g of ion-exchange water were charged, and after replacing the atmosphere in the reaction vessel by nitrogen, 0.2 g of 2,2'-azobis [N-(2-carboxyethyl)-2-methylpropioneamidine]hydrate (VA-057, manufactured by Wako Pure Chemicals Industries, Ltd.) was added, followed by polymerization at 60° C. for one hour. Then, 800 g of the residual monomer preemulsion was added dropwise in the reaction vessel over 3 hours, followed by polymerization for 3 hours. Furthermore, the polymerization was conducted at 60° C. for 3 hours while replacing the atmosphere by nitrogen to obtain an emulsion solution of a water dispersible adhesive composition having a solid content of 48%. After cooling the emulsion solution to room temperature, the pH was adjusted to 8 by adding 10% ammonia water and 3.0 g of an acrylic thickener ARON B-500 (manufactured by Toagosei Co., Ltd.) was added to prepare a water dispersible adhesive composition.

Preparation of Optical Film

A polyvinyl alcohol film (thickness: 80 μm) was stretched by 5 times as long as the original length in an aqueous iodine solution at 40° C., pulled up from the aqueous iodine solution and then dried at 50° C. for 4 minutes to obtain a polarizer. Using a polyvinyl alcohol-based adhesive, triacetyl cellulose film as a transparent protective film was bonded to both sides of the polarizer to obtain an optical film.

Undercoating Treatment

An undercoating treatment was conducted by coating a solution, which was prepared by diluting EPOCROS WS-500 (oxazoline group-containing acrylic polymer, manufactured by Nippon Shokubai Co., Ltd.) with a mixtured solution of water and ethanol (weight ratio: 1:1) so as to adjust the solid content to 0.25% by weight, onto one side of the optical film using a wire bar #5, and drying at 40° C. for 2 minutes.

Preparation of Adhesive Optical Film

The resulting water dispersible adhesive composition was coated onto a release film (polyethylene terephthalate base material, DIAFOIL MRF38, manufactured by Mitsubishi Polyester Film Corp.), followed by a heat treatment at 100° C. for 2 minutes to form a 23 μm thick adhesive layer. The resulting adhesive layer was attached to a surface of an optical film which was preliminarily undercoated to obtain an adhesive optical film.

Example 15

In the same manner as in Example 14, except that, in the undercoating treatment of Example 14, EPOCROS WS-500 (oxazoline group-containing acrylic polymer, manufactured by Nippon Shokubai Co., Ltd.) was replaced by WS-700 (oxazoline group-containing acrylic polymer, manufactured by Nippon Shokubai Co., Ltd.), an adhesive optical film was produced.

Example 16

In the same manner as in Example 14, except that, in the monomer preemulsion of Example 14, 0.01 parts of 3-methacryloyloxypropyl-trimethoxysilane (KBM-503, manufactured by SHIN-ETSU CHEMICAL CO., LTD.) was replaced by 0.02 parts of 3-methacryloyloxypropyl-trimethoxysilane (KBM-503, manufactured by SHIN-ETSU CHEMICAL CO., LTD.), 13 g (2 parts (solid content)) of AQUALON HS-10 (manufactured by Dai-Ichi Kogyo Seiyaku Co., Ltd.) as an emulsifier was replaced by 19 g (3 parts (solid content)) of AQUALON HS-10 (manufactured by Dai-Ichi Kogyo Seiyaku Co., Ltd.), and 360 g of ion-exchange water was replaced by 354 g of ion-exchange water, a monomer preemulsion was prepared. Subsequently, a water dispersible adhesive composition was prepared in the same manner as in Example 14.

In the same manner as in Example 14, except that, in the preparation of the undercoating agent solution in the undercoating treatment of Example 14, EPOCROS WS-500 (oxazoline group-containing acrylic polymer, manufactured by Nippon Shokubai Co., Ltd.) used to prepare the undercoating agent solution was replaced by a mixtured solution(mixing ratio is 95:5 in terms of a solid content ratio) of EPOCROS WS-700 (oxazoline group-containing acrylic polymer, manufactured by Nippon Shokubai Co., Ltd.) and POISE 532A (acrylic acid-maleic acid copolymer ammonium salt, number average molecular weight: about 10000, manufactured by Kao Corporation) and solid content of 0.25% by weight of the undercoating agent solution was replaced by 2.0% by weight, an undercoating agent solution was prepared and an adhesive optical film was produced.

Example 17

In the same manner as in Example 14, except that, in the monomer preemulsion of Example 14, 2 parts of the mono [poly(propylene oxide)methacrylate]phosphate ester (average polymerization degree of propylene oxide: about 5.0) was replaced by 3 parts of a mono[poly(propylene oxide) methacrylate]phosphate ester (average polymerization degree of propylene oxide: about 5.0) and 13 g (2 parts (solid content)) of AQUALON HS-10 (manufactured by Dai-Ichi Kogyo Seiyaku Co., Ltd.) as an emulsifier was replaced by 13 g (2 parts (solid content)) of HITENOL LA-16 (manufactured by Dai-Ichi Kogyo Seiyaku Co., Ltd.), a monomer preemulsion was prepared. Subsequently, a water dispersible adhesive composition was prepared in the same manner as in Example 14.

Then, an adhesive optical film was produced in the same manner as in Example 15.

Example 18

In the same manner as in Example 14, except that, in the monomer preemulsion of Example 14, 2 parts of the mono

[poly(propylene oxide)methacrylate]phosphate ester (average polymerization degree of propylene oxide: about 5.0) was replaced by 4 parts of a mono[poly(propylene oxide)methacrylate]phosphate ester (average polymerization degree of propylene oxide: about 5.0), 13 g (2 parts (solid content)) of AQUALON HS-10 (manufactured by Dai-Ichi Kogyo Seiyaku Co., Ltd.) as an emulsifier was replaced by 19 g (3 parts (solid content)) of HITENOL LA-16 (manufactured by Dai-Ichi Kogyo Seiyaku Co., Ltd.) and 360 g of ion-exchange water was replaced by 354 g of ion-exchange water, a monomer preemulsion was prepared. Subsequently, a water dispersible adhesive composition was prepared in the same manner as in Example 14.

Then, an adhesive optical film was produced in the same manner as in Example 15.

Example 19

In the same manner as in Example 18, a monomer preemulsion was prepared and a water dispersible adhesive composition was prepared.

In the same manner as in Example 14, except that, in the preparation of the undercoating agent solution in the undercoating treatment of Example 14, EPOCROS WS-500 (oxazoline group-containing acrylic polymer, manufactured by Nippon Shokubai Co., Ltd.) used to prepare the undercoating agent solution was replaced by WS-700 (oxazoline group-containing acrylic polymer, manufactured by Nippon Shokubai Co., Ltd.), and the solid content of 0.25% by weight of the undercoating agent solution was replaced by 0.1% by weight, an adhesive optical film was produced.

Example 20

In the same manner as in Example 18, a monomer preemulsion was prepared and a water dispersible adhesive composition was prepared.

In the same manner as in Example 14, except that, in the preparation of the undercoating agent solution in the undercoating treatment of Example 14, EPOCROS WS-500 (oxazoline group-containing acrylic polymer, manufactured by Nippon Shokubai Co., Ltd.) used to prepare the undercoating agent solution was replaced by WS-700 (oxazoline group-containing acrylic polymer, manufactured by Nippon Shokubai Co., Ltd.), and the solid content of 0.25% by weight of the undercoating agent solution was replaced by 0.5% by weight, an adhesive optical film was produced.

Example 21

In the same manner as in Example 14, except that, in the monomer preemulsion of Example 14, 5 parts of acrylic acid was replaced by 11 parts of β-carboxyethyl acrylate (Sipomer β-CEA, manufactured by Rhodia Nicca, Ltd.) and 2 parts of the mono[poly(propylene oxide)methacrylate]phosphate ester (average polymerization degree of propylene oxide: about 5.0) was replaced by the 4 parts of mono[poly(propylene oxide) methacrylate]phosphate ester (average polymerization degree of propylene oxide: about 5.0), a monomer preemulsion was prepared. Subsequently, a water dispersible adhesive composition was prepared in the same manner as in Example 14.

Then, an adhesive optical film was produced in the same manner as in Example 15.

Example 22

In the same manner as in Example 14, except that, in the monomer preemulsion of Example 14, 5 parts of acrylic acid was replaced by 0.5 parts of acrylic acid and 18.8 parts of ω-carboxy-polycaprolactone monoacrylate (ARONIX M-5300, average polymerization degree of caprolactone group: about 2, manufactured by Toagosei Co., Ltd.), 2 parts of the mono[poly(propylene oxide)methacrylate]phosphate ester (average polymerization degree of propylene oxide: about 5.0) was replaced by 4 parts of a mono[poly(propylene oxide)methacrylate]phosphate ester (average polymerization degree of propylene oxide: about 5.0) and 13 g (2 parts (solid content)) of AQUALON HS-10 (manufactured by Dai-Ichi Kogyo Seiyaku Co., Ltd.) as an emulsifier was replaced by 19 g (3 parts (solid content)) of HITENOL LA-16 (manufactured by Dai-Ichi Kogyo Seiyaku Co., Ltd.), a monomer preemulsion was prepared. Subsequently, a water dispersible adhesive composition was prepared in the same manner as in Example 14.

Then, an adhesive optical film was produced in the same manner as in Example 15.

Comparative Example 14

In the same manner as in Example 14, except that, in the monomer preemulsion of Example 14, the mono[poly(propylene oxide)methacrylate]phosphate ester (average polymerization degree of propylene oxide: about 5.0) was not added and 0.01 parts of 3-methacryloyloxypropyl-trimethoxysilane (KBM-503, manufactured by SHIN-ETSU CHEMICAL CO., LTD.) was replaced by 0.06 parts of 3-methacryloyloxypropyl-trimethoxysilane (KBM-503, manufactured by SHIN-ETSU CHEMICAL CO., LTD.), a monomer preemulsion was prepared. Subsequently, a water dispersible adhesive composition was prepared in the same manner as in Example 14.

Then, an adhesive optical film was produced in the same manner as in Example 15.

Comparative Example 15

In the same manner as in Example 14, a monomer preemulsion was prepared and a water dispersible adhesive composition was prepared.

In the same manner as in Example 14, except that, in the preparation of the undercoating agent solution in the undercoating treatment of Example 14, EPOCROS WS-500 (oxazoline group-containing acrylic polymer, manufactured by Nippon Shokubai Co., Ltd.) used to prepare the undercoating agent solution was replaced by a mixtured solution(mixing ratio is 1:1 in terms of a solid content ratio) of a water dispersible urethane resin (TAKERAK W511, manufactured by MITSUI TAKEDA CHEMICALS, INC.) and a water dispersible isocyanate-based curing agent (TAKENATE WD725, manufactured by MITSUI TAKEDA CHEMICALS, INC.), and the solid content of 0.25% by weight of the undercoating agent solution was replaced by 2.0% by weight, an undercoating agent solution was prepared and an adhesive optical film was produced.

Comparative Example 16

In the same manner as in Example 14, except that, in the monomer preemulsion of Example 14, the mono[poly(propylene oxide)methacrylate]phosphate ester (average polymerization degree of propylene oxide: about 5.0) was not added and 0.01 parts of 3-methacryloyloxypropyl-trimethoxysilane (KBM-503, manufactured by SHIN-ETSU CHEMICAL CO., LTD.) was replaced by 0.02 parts of 3-methacryloyloxypropyl-trimethoxysilane (KBM-503, manufactured by SHIN-ETSU CHEMICAL CO., LTD.), a monomer preemulsion was prepared. Subsequently, a water dispersible adhesive composition was prepared in the same manner as in Example 14.

In the same manner as in Example 14, except that, in the preparation of the undercoating agent solution in the undercoating treatment of Example 14, EPOCROS WS-500 (oxazoline group-containing acrylic polymer, manufactured by Nippon Shokubai Co., Ltd.) used to prepare the undercoating agent solution was replaced by POLYMENT SK-1000 (ethyleneimine-modified acrylic polymer, manufactured by Nippon Shokubai Co., Ltd.), and the solid content of 0.25% by weight of the undercoating agent solution was replaced by 2.0% by weight, an adhesive optical film was produced.

Comparative Example 17

In the same manner as in Example 14, except that, in the monomer preemulsion of Example 14, 5 parts of acrylic acid was replaced by 20 parts of acrylic acid and the mono[poly(propylene oxide)methacrylate]phosphate ester (average polymerization degree of propylene oxide: about 5.0) was not added, a monomer preemulsion was prepared. Subsequently, the polymerization was conducted in the same manner as in Example 14. However, since cohesion occurred during the polymerization, a water dispersible adhesive composition could not be obtained.

Comparative Example 18

In the same manner as in Example 14, except that, in the monomer preemulsion of Example 14, acrylic acid was not added and 2 parts of the mono[poly(propylene oxide)methacrylate]phosphate ester (average polymerization degree of propylene oxide: about 5.0) was replaced by 25 parts of a mono[poly(ethylene oxide)methacrylate]phosphate ester (average polymerization degree of ethylene oxide: about 5.5), a monomer preemulsion was prepared. Subsequently, the polymerization was conducted in the same manner as in Example 14. However, since cohesion occurred during the polymerization, a water dispersible adhesive composition could not be obtained.

TABLE 4

| Composition of raw material (monomer) | | | Example 14 | Example 15 | Example 16 | Example 17 | Example 18 | Example 19 | Example 20 |
|---|---|---|---|---|---|---|---|---|---|
| Water dispersible adhesive composition (adhesive layer) | Alkyl (meth)acrylate ester | Butyl acrylate | 100 | 100 | 100 | 100 | 100 | 100 | 100 |
| | Carboxyl group-containing vinyl monomer | Acrylic acid | 5 | 5 | 5 | 5 | 5 | 5 | 5 |
| | | β-carboxyethyl acrylate (Sipomer β-CEA) | — | — | — | — | — | — | — |
| | | ω-carboxy-polycaprolactone monoacrylate (ARONIX M-5300*2) | — | — | — | — | — | — | — |
| | Phosphoric acid group-containing vinyl monomer | Mono[poly(propylene oxide)methacrylate]phosphate ester*3 | 2 | 2 | 2 | 3 | 4 | 4 | 4 |
| | | Mono[poly(ethylene oxide)methacrylate]phosphate ester*4 | — | — | — | — | — | — | — |
| | Alkoxysilyl group-containing vinyl monomer | 3-methacryloyloxypropyl-trimethoxysilane | 0.01 | 0.01 | 0.02 | 0.01 | 0.01 | 0.01 | 0.01 |
| | Emulsifier | AQUALON HS-10 | 2 | 2 | 3 | — | — | — | — |
| | | HITENOL LA-16 | — | — | — | 2 | 3 | 3 | 3 |
| | | LATEMUL PD-104 | — | — | — | — | — | — | — |

| Composition of raw material (monomer) | | | Example 21 | Example 22 | Comp. Example 14 | Comp. Example 15 | Comp. Example 16 | Comp. Example 17 | Comp. Example 18 |
|---|---|---|---|---|---|---|---|---|---|
| Water dispersible adhesive composition (adhesive layer) | Alkyl (meth)acrylate ester | Butyl acrylate | 100 | 100 | 100 | 100 | 100 | 100 | 100 |
| | Carboxyl group-containing vinyl monomer | Acrylic acid | — | 0.5 | 5 | 5 | 5 | 20 | — |
| | | β-carboxyethyl acrylate (Sipomer β-CEA) | 11 | — | — | — | — | — | — |
| | | ω-carboxy-polycaprolactone monoacrylate (ARONIX M-5300*2) | — | 18.8 | — | — | — | — | — |
| | Phosphoric acid group-containing vinyl monomer | Mono[poly(propylene oxide)methacrylate]phosphate ester*3 | 4 | 4 | — | — | — | — | — |
| | | Mono[poly(ethylene oxide)methacrylate]phosphate ester*4 | — | — | — | — | — | — | 25 |
| | Alkoxysilyl group-containing vinyl monomer | 3-methacryloyloxypropyl-trimethoxysilane | 0.01 | 0.01 | 0.06 | 0.06 | 0.02 | 0.01 | 0.01 |
| | Emulsifier | AQUALON HS-10 | 2 | — | 2 | 2 | 2 | 2 | 2 |
| | | HITENOL LA-16 | — | 3 | — | — | — | — | — |
| | | LATEMUL PD-104 | — | — | — | — | — | — | — |

TABLE 4-continued

| Composition of raw material (monomer) | | | Example 14 | Example 15 | Example 16 | Example 17 | Example 18 | Example 19 | Example 20 |
|---|---|---|---|---|---|---|---|---|---|
| Undercoating agent solution (undercoat layer)*1 | Oxazoline group-containing polymer | EPOCROS WS-500 | 0.25 | — | — | — | — | — | — |
| | | EPOCROS WS-700 | — | 0.25 | — | 0.25 | 0.25 | 0.1 | 0.5 |
| | Mixture of oxazoline group-containing polymer and carboxyl group-containing compound | EPOCROS WS-700/ POISE 532A | — | — | 2 (95/5) | — | — | — | — |
| | Oxazoline group-free polymer | TAKERAK W511/ TAKENATE WD725 | — | — | — | — | — | — | — |
| | | POLYMENT SK-1000 | — | — | — | — | — | — | — |
| Carboxyl group concentration [mmol/g] | | | 0.65 | 0.65 | 0.65 | 0.64 | 0.64 | 0.64 | 0.64 |
| Phosphoric acid group concentration [mmol/g] | | | 0.04 | 0.04 | 0.04 | 0.06 | 0.08 | 0.08 | 0.08 |

| Composition of raw material (monomer) | | | Example 21 | Example 22 | Comp. Example 14 | Comp. Example 15 | Comp. Example 16 | Comp. Example 17 | Comp. Example 18 |
|---|---|---|---|---|---|---|---|---|---|
| Undercoating agent solution (undercoat layer)*1 | Oxazoline group-containing polymer | EPOCROS WS-500 | — | — | — | — | — | | |
| | | EPOCROS WS-700 | 0.25 | 0.25 | 0.25 | — | — | | |
| | Mixture of oxazoline group-containing polymer and carboxyl group-containing compound | EPOCROS WS-700/ POISE 532A | — | — | — | — | — | | |
| | Oxazoline group-free polymer | TAKERAK W511/ TAKENATE WD725 | — | — | — | 2 (1/1) | — | | |
| | | POLYMENT SK-1000 | — | — | — | — | 2 | | |
| Carboxyl group concentration [mmol/g] | | | 0.66 | 0.61 | 0.66 | 0.66 | 0.66 | 2.31 | 0.00 |
| Phosphoric acid group concentration [mmol/g] | | | 0.08 | 0.07 | 0.00 | 0.00 | 0.00 | 0.00 | 0.48 |

*1The numerical value indicates a solid content (% by weight) in an undercoating agent solution.
The numerical value in parenthesis indicates a solid content ratio.
*2Average polymerization degree of caprolactone group: about 2
*3Average polymerization degree of propylene oxide: about 5.0
*4Average polymerization degree of ethylene oxide: about 5.5

In Table 4, the composition of the monomer is represented by parts by weight. In Table 4, a carboxyl group concentration and a phosphoric acid group concentration are also shown.

In Table 4, the carboxyl group concentration was calculated on the assumption that a molecular weight of acrylic acid is 72, a molecular weight of a β-carboxyethyl acrylate is 144 and a molecular weight (average molecular weight) of a w-carboxy-polycaprolactone monoacrylate (average polymerization degree of caprolactone group: about 2) is 276.

In Table 4, the phosphoric acid group concentration was calculated on the assumption that a molecular weight (average molecular weight) of a mono[poly(propylene oxide) methacrylate]phosphate ester (average polymerization degree of propylene oxide: about 5.0) is 456 and a molecular weight (average molecular weight) of a mono[poly(ethylene oxide)methacrylate]phosphate ester (average polymerization degree of ethylene oxide: about 5.5) is 413.5.

The numerical value in the column of an undercoating agent solution (under coat layer) in Table 4 indicates a solid content (% by weight) in an undercoating agent solution. The numerical value in parenthesis indicates a solid content ratio.

Evaluation

10) Adhesion to Glass of Adhesive Optical Film

Each of the adhesive optical films of Examples 14 to 22 and Comparative Examples 14 to 16 was cut into pieces having a width of 25 mm and the resulting cut film was sticked onto a glass plate (CORNING #1737, manufactured by Corning Co.), and then they were contact-bonded during one reciprocation of a rubber roller having a load of 2 kg. The resulting specimen was allowed to stand in an autoclave at 50° C. under 0.5 MPa for 15 minutes and cooled to 25° C., and then a 90° peel adhesion (peel rate: 300 mm/min) was measured (initial adhesion).

The specimen was allowed to stand in the autoclave, allowed to stand in an atmosphere at 60° C. for 40 hours and cooled to 25° C., and then a 90° peel adhesion (peel rate: 300 mm/min) was measured. The results are shown in Table 5.

The higher the peel adhesion is, the better adhesion to glass is.

11) Adhesion and Fixation of Adhesive Optical film

Each of the adhesive optical films of Examples 14 to 22 and Comparative Examples 14 to 16 was cut into pieces measuring 235 mm×310 mm and the resulting cut film was sticked onto a 0.7 mm thick glass plate (CORNING #1737, manufactured by Corning Co.). The resulting specimen was allowed to stand in an autoclave at 50° C. under 0.5 MPa for 15 minutes, allowed to stand in an atmosphere at 90° C. and an atmosphere at 60° C./90° RH for 500 hours, and then it was visually observed whether or not peeling of the adhesive optical film occurred. The results are shown in Table 5.

The presence or absence of peeling of the adhesive optical film was evaluated according to the following criteria.

A: Change such as peeling was not observed.
B: Peeling in size of less than 1 mm was observed at the end of the adhesive optical film.
C: Peeling in size of 1 mm or more was observed at the end of the adhesive optical film.

12) Gel Fraction of Water Dispersible Adhesive Composition

First, each of the water dispersible adhesive composition (about 100 mg) of Examples 14 to 22 and Comparative Examples 14 to 16 was wrapped with a Teflon sheet (trademark, product number: NTF-1122) and a kite string (12 cm), weights of which were previously measured, and the weight of the resulting parcel was measured. The parcel was placed in a 50 ml glass bottle and a sufficient amount of ethyl acetate was charged and, after sealing the glass bottle, the parcel was kept immersed at room temperature for 7 days. After pulling up the immersed parcel, ethyl acetate adhered to the Teflon sheet was wiped off and the parcel was dried at 130° C. for 2 hours by a drying machine. Thereafter, the weight of the dried parcel was measured. Then, the gel fraction was calculated by the following equation.

Gel fraction(% by weight)=$\{(C-A)/(B-A)\} \times 100$

The symbols in the equation are as follows.
A (g): total weight of a Teflon sheet and a kite string (tare weight)
B (g): total weight of a Teflon sheet, a kite string and a water dispersible adhesive composition before being immersed in ethyl acetate and dryed
C (g): total weight of a Teflon sheet and a kite string, and a water dispersible adhesive composition after being immersed in ethyl acetate and dryed The measurement results are shown in Table 5.

TABLE 5

| | Evaluation of physical properties | | | Example 14 | Example 15 | Example 16 | Example 17 | Example 18 | Example 19 | Example 20 |
|---|---|---|---|---|---|---|---|---|---|---|
| Adhesive optical film | Adhesion to glass (peel adhesion [N/25 mm]) | Peel rate [300 mm/min.] | Initial | 5.7 | 5.7 | 5.0 | 2.5 | 2.1 | 2.1 | 2.1 |
| | | | at 60° C. for 40 hours | 18.5 | 18.5 | 14.0 | 7.9 | 11.8 | 11.8 | 11.8 |
| | Adhesion and fixation | | Heat resistance (90° C.) | A | A | A | A | A | A | A |
| | | | Moist heat resistance (60° C./90% RH) | A | A | A | A | A | A | A |
| Water dispersible adhesive composition | Gel fraction (%) | | | 95 | 95 | 91 | 85 | 86 | 86 | 86 |

| | Evaluation of physical properties | | | Example 21 | Example 22 | Comp. Example 14 | Comp. Example 15 | Comp. Example 16 | Comp. Example 17 | Comp. Example 18 |
|---|---|---|---|---|---|---|---|---|---|---|
| Adhesive optical film | Adhesion to glass (peel adhesion [N/25 mm]) | Peel rate [300 mm/min.] | Initial | 7.4 | 1.2 | 2.1 | 2.1 | 3.4 | Water dispersible adhesive composition could not be obtained because cohesion occurred during the polymerization. | |
| | | | at 60° C. for 40 hours | 24.9 | 10.3 | 6.0 | 6.0 | 6.8 | | |
| | Adhesion and fixation | | Heat resistance (90° C.) | A | A | A | C | C | | |
| | | | Moist heat resistance (60° C./90% RH) | A | A | C | B | C | | |
| Water dispersible adhesive composition | Gel fraction (%) | | | 92 | 87 | 93 | 93 | 87 | | |

While the illustrative embodiments and examples of the present invention are provided in the above description, such are for illustrative purpose only and it is not to be construed restrictively. Modification and variation of the present invention which will be obvious to those skilled in the art are to be covered in the following claims.

What is claimed is:
1. An adhesive optical film comprising:
an optical film;
an adhesive layer laminated on at least one surface of the optical film; and
an under coat layer containing an oxazoline group-containing polymer, which is interposed between the optical film and the adhesive layer.

2. The adhesive optical film according to claim 1, wherein the under coat layer is made of a mixture of an oxazoline group-containing polymer and a polyamine-based polymer.

3. The adhesive optical film according to claim 1, wherein the under coat layer is made of a mixture of an oxazoline group-containing polymer and a compound having a plurality of carboxyl groups.

4. The adhesive optical film according to claim 1, wherein the under coat layer is made of a mixture of an oxazoline group-containing polymer, a polyamine-based polymer and a compound having a plurality of carboxyl groups.

5. The adhesive optical film according to claim 1, wherein the oxazoline group-containing polymer has a principal chain being an acryl skeleton, and has an oxazoline group in a side chain of the principal chain.

6. The adhesive optical film according to claim 2, wherein the polyamine-based polymer has a principal chain being an acryl skeleton, and has a polyethyleneimine chain in a side chain of the principal chain.

7. The adhesive optical film according to claim 3, wherein the compound having a plurality of carboxyl groups has a number average molecular weight of 1000 or more.

8. The adhesive optical film according to claim 1, wherein the under coat layer is made of a water dispersible polymer.

9. The adhesive optical film according to claim 1, wherein the adhesive layer is made of an acrylic adhesive.

10. The adhesive optical film according to claim 9, wherein the acrylic adhesive is water dispersible.

11. The adhesive optical film according to claim 1, wherein the adhesive layer has a functional group which reacts with an oxazoline group and/or an amino group.

12. The adhesive optical film according to claim 11, wherein the functional group, which reacts with an oxazoline group and/or an amino group, is a carboxyl group.

* * * * *